US 6,489,917 B2

(12) United States Patent
Geisheimer et al.

(10) Patent No.: US 6,489,917 B2
(45) Date of Patent: Dec. 3, 2002

(54) PHASE-BASED SENSING SYSTEM

(75) Inventors: Jonathan Geisheimer, Mableton, GA (US); Gene Greneker, Marietta, GA (US); Scott Billington, Chamblee, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 09/992,501

(22) Filed: Nov. 6, 2001

(65) Prior Publication Data

US 2002/0097180 A1 Jul. 25, 2002

Related U.S. Application Data

(60) Provisional application No. 60/250,423, filed on Nov. 30, 2000.

(51) Int. Cl.[7] ............................................. G01S 13/50
(52) U.S. Cl. ................... 342/127; 342/342; 342/28; 342/109; 342/115
(58) Field of Search ..................... 342/28, 98, 102, 342/104, 109, 114, 115, 118, 126, 127, 135

(56) References Cited

U.S. PATENT DOCUMENTS

| 4,045,727 A | | 8/1977 | Yu et al. ............... 324/58.5 B |
| 4,346,383 A | | 8/1982 | Woolcock et al. ........... 343/12 |
| 4,359,683 A | | 11/1982 | Chivers ................ 324/58.5 B |
| 4,384,819 A | | 5/1983 | Baker .......................... 415/14 |
| 4,481,825 A | | 11/1984 | Kliuev et al. ................ 73/655 |
| 4,484,193 A | | 11/1984 | Bellew ........................ 342/98 |
| 4,490,718 A | | 12/1984 | Opitz et al. ................ 342/192 |
| 4,507,658 A | | 3/1985 | Keating ................... 343/12 R |
| 4,641,138 A | | 2/1987 | Opitz ......................... 342/192 |
| 4,643,592 A | * | 2/1987 | Lewis et al. ............... 384/100 |
| 4,673,940 A | | 6/1987 | Barley et al. .............. 342/192 |
| 4,700,127 A | | 10/1987 | Sasaki et al. .......... 324/58.5 C |
| 4,862,061 A | | 8/1989 | Damon .................. 324/58.5 R |
| 4,881,079 A | * | 11/1989 | Peregrim ................... 342/194 |
| 4,901,083 A | | 2/1990 | May et al. .................. 342/128 |
| 5,422,477 A | * | 6/1995 | de La Chapelle et al. ....... 250/227.12 |
| 5,459,405 A | | 10/1995 | Wolff et al. ................. 324/644 |
| 5,479,826 A | | 1/1996 | Twerdochlib et al. ......... 73/660 |
| 5,565,872 A | | 10/1996 | Prevatt et al. .............. 342/193 |
| 5,600,253 A | | 2/1997 | Cohen et al. ............... 324/644 |
| 5,642,194 A | * | 6/1997 | Erskine ...................... 356/497 |
| 5,670,886 A | | 9/1997 | Wolff et al. ................. 324/644 |
| 5,760,731 A | | 6/1998 | Holmes ...................... 342/118 |
| 5,818,242 A | | 10/1998 | Grzybowski et al. ........ 324/642 |
| 5,828,331 A | | 10/1998 | Harper ......................... 342/22 |
| 5,905,380 A | | 5/1999 | Weiner et al. .............. 324/644 |
| 6,236,352 B1 | * | 5/2001 | Walmsley ................... 342/118 |
| 6,426,716 B1 | * | 7/2002 | McEwan ..................... 342/28 |
| 2002/0097180 A1 | * | 7/2002 | Geisheimer et al. ........ 342/127 |

FOREIGN PATENT DOCUMENTS

JP   59063531 A2   4/1984   ............ G01H/9/00

OTHER PUBLICATIONS

Woods, et al.; :A High Accuracy Microwave Ranging System for Industrial Applications; 1993; pp. 812–816.

(List continued on next page.)

Primary Examiner—John B. Sotomayor
(74) Attorney, Agent, or Firm—Thomas, Kayden Horstemeyer & Risley, LLP

(57) ABSTRACT

A system for sensing and measuring the relative motion of an object, comprising a transceiver device configured to transmit a signal toward an object, a plurality of detectors offset in phase to receive the transmitted signal and a reflected signal, and a processor configured with logic to measure a phase shift resulting from the relative motion of the object between the transmitted signal and the reflected signal at the plurality of detectors, wherein the processor is further configured with the logic to relate the phase shift to the relative motion of the object.

90 Claims, 22 Drawing Sheets

OTHER PUBLICATIONS

Maskell, et al.; "A Microprocessor Controlled Microwave Ranging System for High Accuracy Industrial Applications"; May, 1994; pp. 1269–1272.

Gueuning, et al.; "Accurate Distance Measurement by an Autonomous Ultrasonic System Combining Time–of–Flight and Phase–Shift Methods"; Dec., 1997; pp. 1236–1240.

NSF Grant Proposal, Sep. 15, 2000.

Geisheimer, et al.; "A Microwave Terrain Sensor for Automotive Sensing Applications"; Mar., 2001; pp. 1–7.

Geisheimer, et al.; "Radio Frequency (RF) Vibrometer"; Jun. 5, 2000.

Kirk, et al.; "Precision Terrain Height Measurement Sensor"; 1994; pp. 7–10.

Kaleja, et al.; "Active Integrated Antennas for Automotive Applications".

Wollitzer, et al.; "Multifunctional Millimeter Wave Radar Sensor for Vehicle Applications"; Sep., 1998; pp. 124–129.

Josef Buechler; "Two Frequency Multifunctional Radar for Mobile Application"; 1995; pp. 125–128.

Sarabandi, et al.; "Polarimetric Characterization of Debris and Faults in the Highway Environment at Millimeter–Wave Frequencies"; Nov. 2000; pp. 1756–1768.

Sarabandi, et al.; "Modeling and Measurements of Scattering from Road Surfaces at Millimeter–Wave Frequencies"; Nov. 1997, pp. 1679–1688.

Hocknell, et al.; "Remote Vibration Measurements: Compensation of Waveform Distortion Due to Whole Body Translations"; 1998; pp. 285–307.

Dhadwal, et al., "Integrated Fiber Optic Light Probe: Measurement of Static Deflections in Rotating Turbomachinery"; Feb., 1996; pp. 546–552.

Flotow, et al., "Health Monitoring and Prognostics of Blades and Disks with Blade Tip Sensors"; 2000; pp. 433–440.

Lubetsky, et al.; "Microwave Vibrometer for Testing of the Rotating Objects"; May, 1998; pp. 2912–2913.

Wagner, et al., "Novel Microwave Vibration Monitoring System for Industrial Power Generating Turbines"; 1998; pp. 1211–1214.

Figueroa, et al.; "An Ultrasonic Ranging System for Structural Vibration Measurements"; Aug., 1991; pp. 764–769.

Matar, et al.; "Non Contact Measurment of Vibration Using Airborne Ultrasound"; 1996; pp. 697–700.

Flotow, et al.; "Health Monitoring and Prognostics of Blades and Disks with Blade Tip Sensors"; 2000; pp. 433–440.

Mast, et al.; "Micropower Impulse Radar Technology and Applications"; Apr., 1998.

* cited by examiner

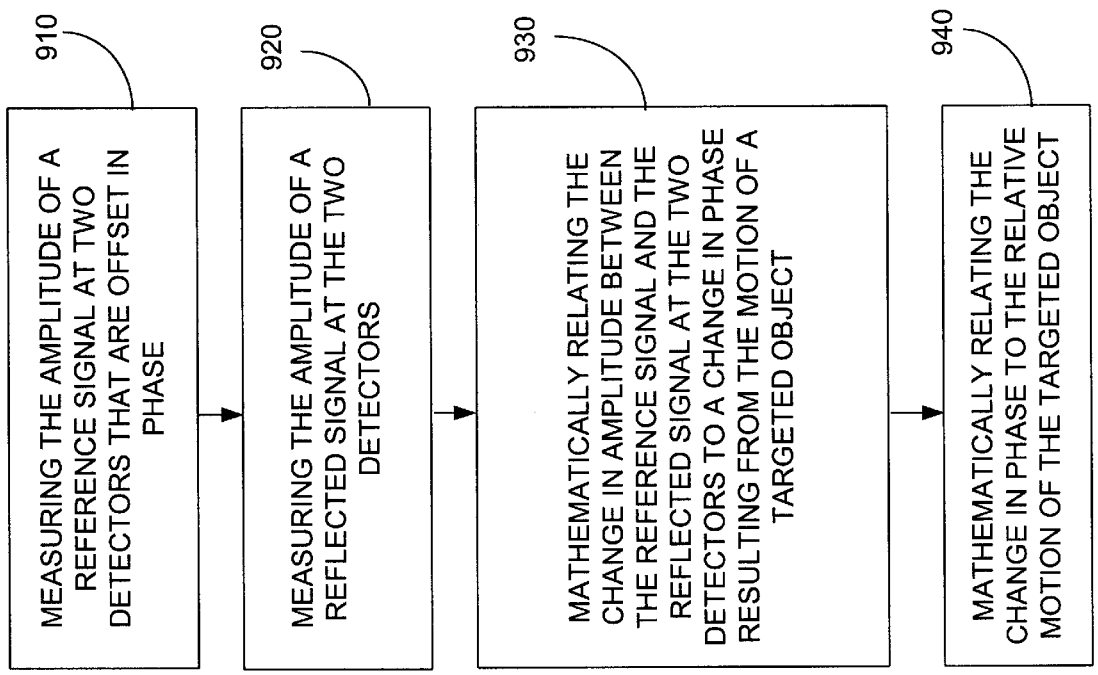

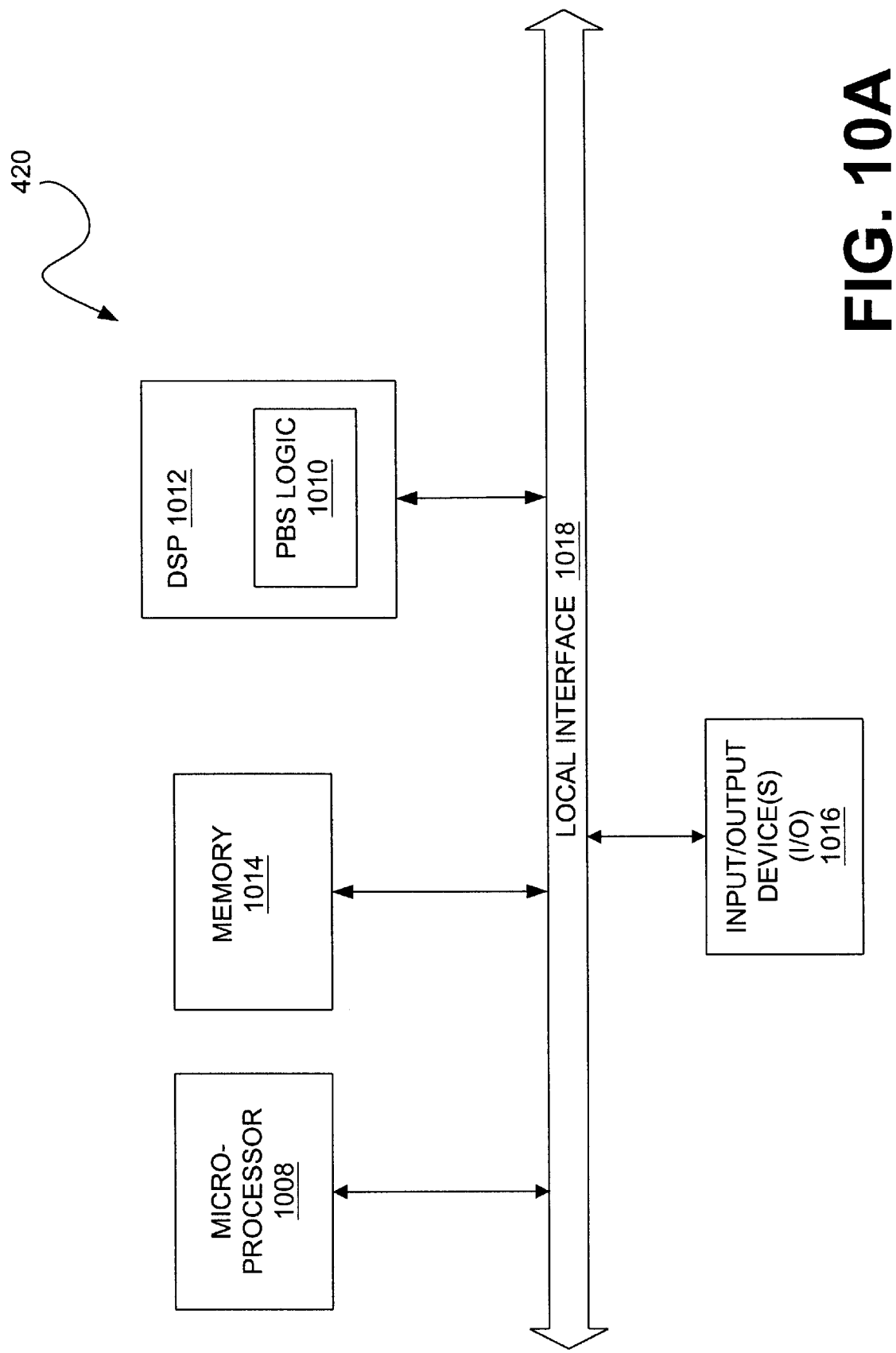

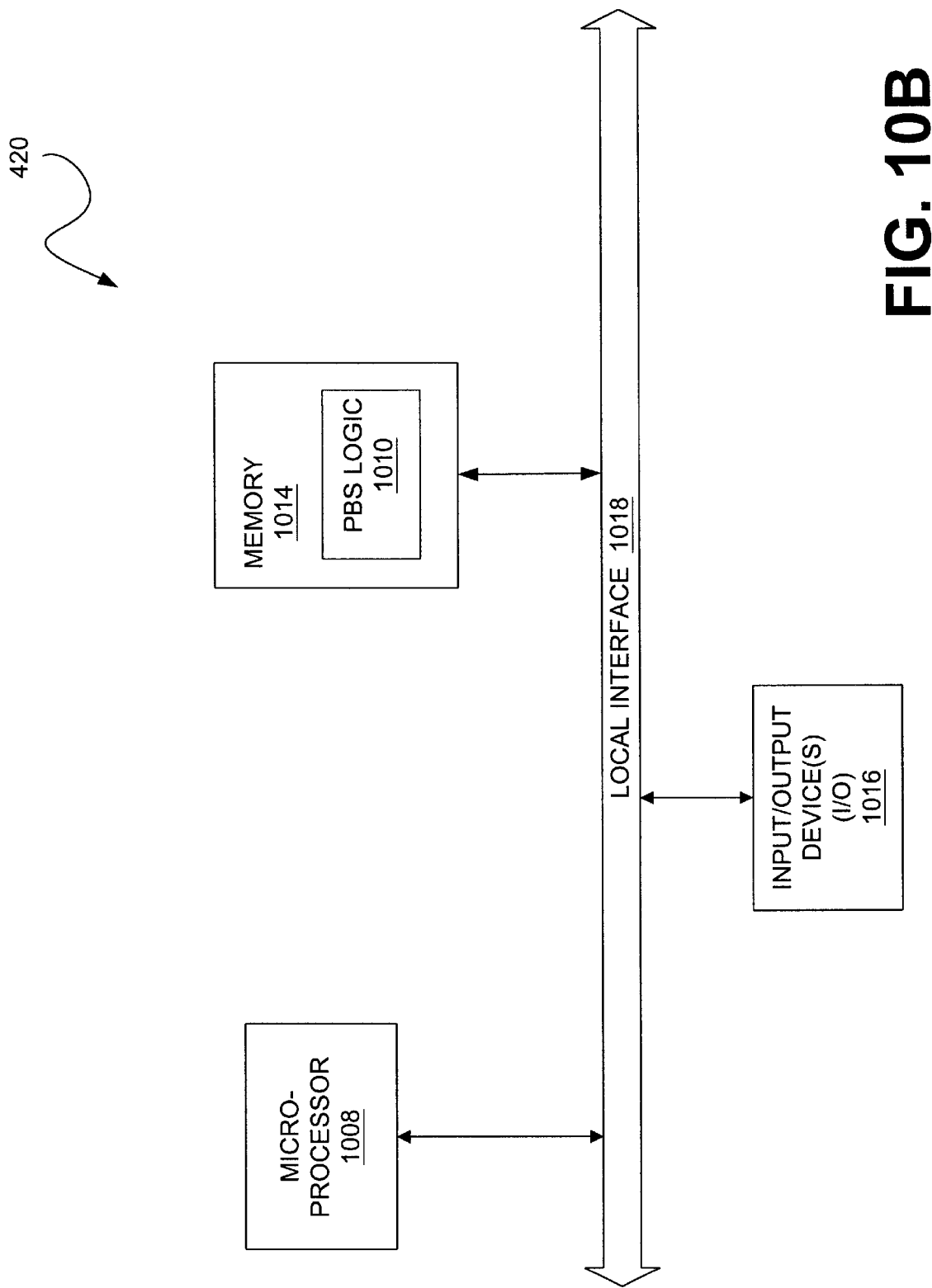

PHASE-BASED SENSING SYSTEM

CROSS-REFERENCE TO RELATED APPLICATION

This application claims priority to and the benefit of the filing date of U.S. provisional application, Ser. No. 60/250,423, filed Nov. 30, 2000, entitled, "Phase-Based Microwave Vibrometer for the Measurement of Sub-Millimeter Vibration and Displacement," which is entirely incorporated herein by reference.

TECHNICAL FIELD

The present invention generally relates to sensing systems and, more particularly, to non-contact sensing systems.

BACKGROUND OF THE INVENTION

Sensing systems are employed for a wide variety of purposes and in diverse fields. There are sensing systems for detecting motion, surface irregularities, environmental conditions, and for physiological conditions, to name a few. Applications can be used in such industries as medical, process, aeronautical, and others. Such diversity in purpose and industry results in a multitude of considerations for the designer or user of the sensing system. These considerations include cost, precision, measurement range, durability, maintenance requirements, and even the physical characteristics of the sensed object, among others.

Non-contact, or non-invasive, sensing systems are sensing systems that, unlike direct contact sensing systems, do not require the sensing portion (e.g. sensor) to physically contact (directly or through an intermediary) the sensed, or targeted object. Non-contact sensing systems offer many advantages over traditional direct contact sensing systems, such as the ability to provide information regarding an object and/or condition of interest without expensive and invasive sensor mounting assemblies. Non-contact systems, unlike contact systems, also have the advantage of not changing the system they are measuring. Radar systems are an example of one non-invasive sensing system. Radar systems use reflected radio waves, typically on the order of 0.9–100 giga hertz (GHz) to determine the presence, location, and speed of sensed objects. Some radar systems operate by transmitting either a constant continuous wave (CW) signal or a pulsed signal. Most of these CW radar systems operate under the principle of the Doppler effect, which is the change in received signal frequency with respect to transmitted signal frequency, due to motion. CW radar systems using the Doppler effect provide a mechanism of detecting a moving target by transmitting microwaves at a targeted object and detecting the change in frequency of microwave signals reflected from the target. Continuous wave radar techniques are non-contact, relatively inexpensive, and provide a sensing mechanism that is relatively unaffected by dust, debris, rain, and many other obscurants when the proper transmit frequencies are used. Conventional radar sensing systems provide limited information on the speed, location, and direction of movement of targets being sensed, but are unable to provide high resolution information of "sensed objects" on the subwavelength scale. Thus, there exists a need for a radar sensing system that improves the information received about the sensed target.

Thus, a heretofore unaddressed need exists in the industry to address the aforementioned deficiencies and inadequacies.

SUMMARY OF THE INVENTION

The present invention provides, among other things, a sensing system. The sensing system can generally be described as including, among other things, a transceiver device configured to transmit a signal toward an object, a plurality of detectors offset in phase to receive the transmitted signal and a reflected signal, and a processor configured with logic to measure a phase shift resulting from the relative motion of the object between the transmitted signal and the reflected signal at the plurality of detectors, wherein the processor is further configured with the logic to relate the phase shift to the relative motion of the object.

The present invention can also be viewed as, among other things, a sensing method. The method can generally be viewed as including the following steps: measuring a phase shift resulting from the relative motion of an object between a transmitted signal and a reflected signal at a plurality of detectors; and relating the phase shift to the relative motion of the object.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 9 is a flowchart illustrating the phase-based signal processing algorithm of the SPU of the PBS system of FIG. 4, in accordance with one embodiment of the invention.

FIGS. 10A–B are block diagrams of the example SPU of the PBS system of FIG. 4, in accordance with one embodiment of the invention.

DETAILED DESCRIPTION OF THE PREFERRED EMBODIMENTS

Figure 1:
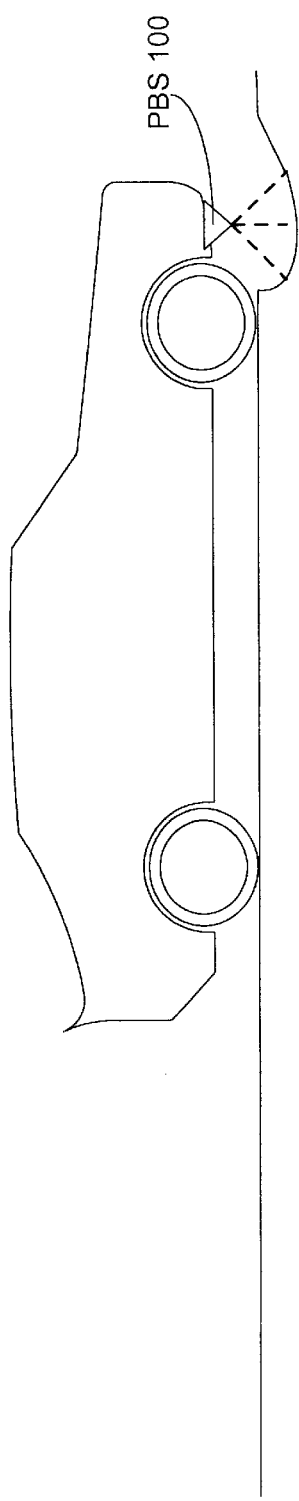
FIGS. 1–3 are block diagrams of example implementations of a phase-based sensing system (PBS system).
Figure 2:
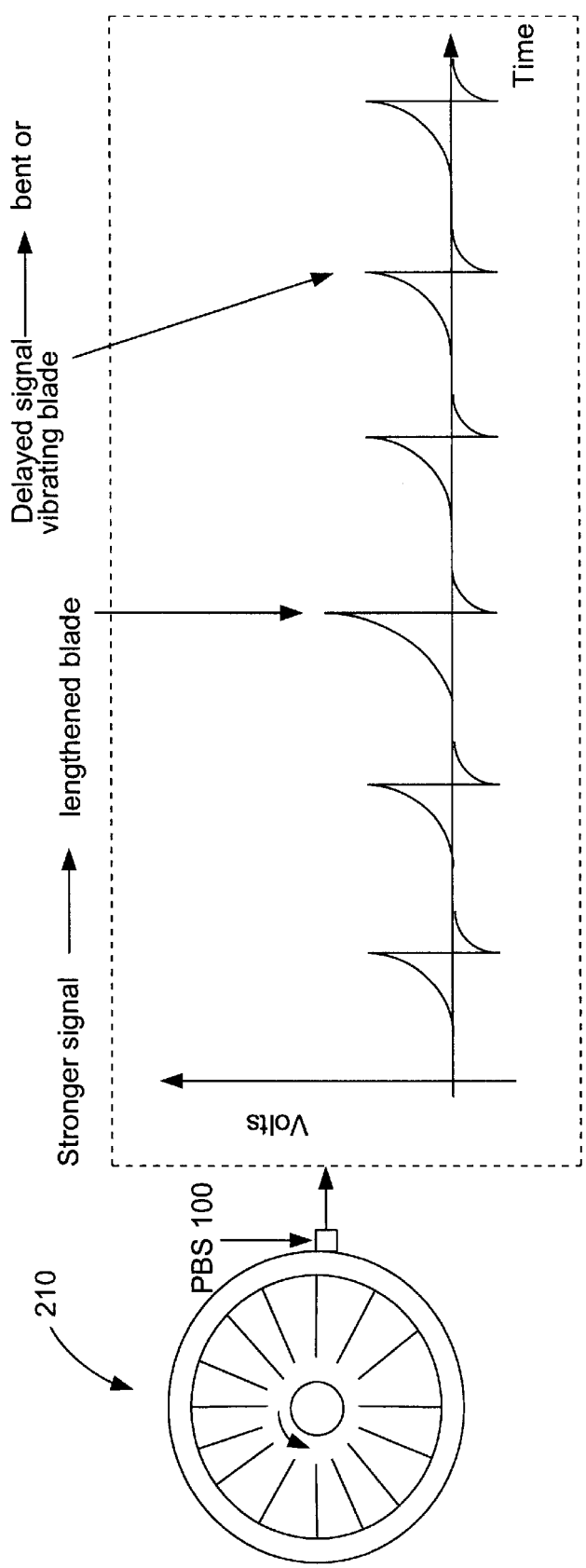
Figure 3:
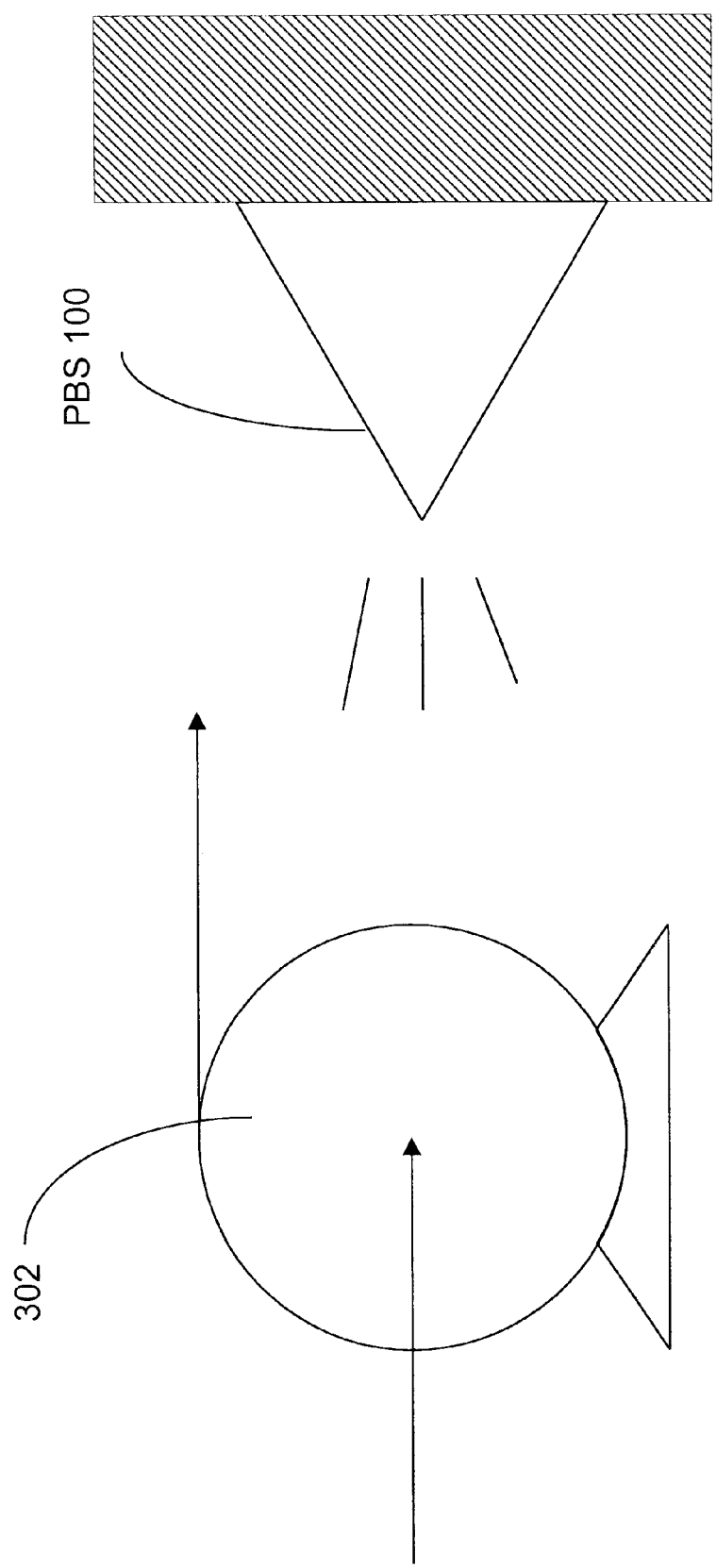
Figure 4:
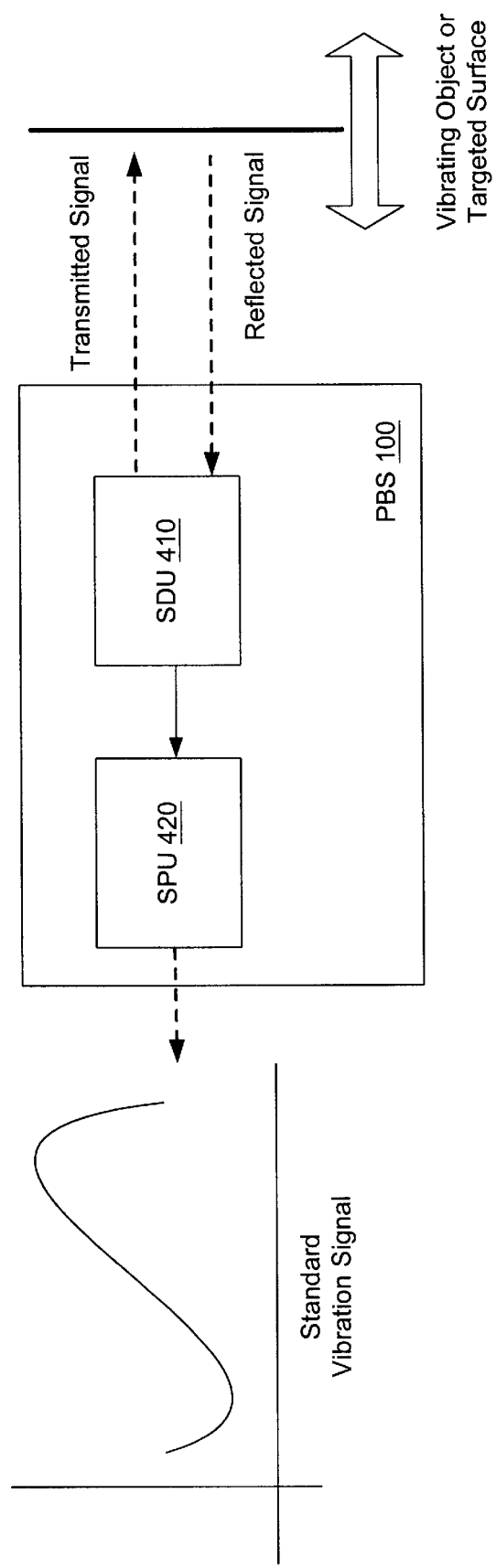
FIG. 4 is a block diagram of the PBS systems of FIGS. 1–3, in accordance with one embodiment of the invention.

The preferred embodiments of the present invention provide, among other things, a phase-based sensing (PBS)

system, or sensing system. The PBS system will now be described more fully hereinafter with reference to FIGS. 1–10, in which embodiments of the invention are shown. FIGS. 1–3 provide an illustration of example implementations of the PBS system. FIG. 4 provides a block diagram of the PBS system, with the components of the PBS system illustrated in more detail in FIGS. 5A and 5B and 10A and 10B. FIGS. 6A–8D illustrate how the detection of a targeted object is electronically represented in the PBS system for three different scenarios. FIG. 9 is a flowchart outlining the general steps that may be used when processing the reflected signal to provide a signal representing the relative motion of the targeted object (or the surface deviation of the targeted object). Herein, relative motion of the targeted object (i.e. a sensed object) will be understood to encompass applications where either the sensed object is moving (such as a machine or machine part) relative to the fixed PBS system, or where the device the PBS system is attached to is moving relative to the sensed (targeted) object (e.g., where the change in terrain sensed by a terrain sensor attached to a vehicle causes the distance between the sensor and the sensed surface to vary). This invention can, however, be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" given herein are intended to be non-limiting, and among others.

FIG. 1 is a block diagram of one example implementation of the PBS system. In this example, the PBS system 100 is used for non-contact measurement of road/terrain surfaces immediately ahead of the tires of a moving vehicle. Although illustrated as integrated as a single unit, the PBS system 100 can be in the form of several components in electrical communication with each other, with each component either proximally located, or spatially separated throughout the vehicle or system in which it is used. The PBS system 100 emits a microwave signal directed downward (orthogonally, and thus non-Doppler as described below) to the surface to measure variations in the road surface. Herein, orthogonal or orthogonally directed signals, will be understood to mean orthogonal to the relative motion of the targeted object, such as a road surface or a machine that is monitored for excessive movement, for example. When placed before one or more tires (or tracts, or sleds, or whatever surface contacts are provided for by the vehicle), the sensor can provide information about the road surface in advance of the tire and suspension system, or other systems that can utilize the advanced sensing information. This information can be obtained rapidly enough so that the suspension system (or other systems) can adapt itself in advance of any potential road or terrain hazards. In other embodiments, the information can be provided in special utility vehicles, such as military vehicles with fire weapon systems mounted therein, to provide a control signal to modify a firing solution based on a measurement of the terrain ahead. In other embodiments, the PBS system 100 can be used to scan and image surfaces of all types to provide sub-wavelength resolution.

FIG. 2 is a composite of a block diagram and a signal plot of an example engine monitoring implementation of the PBS system 100. Vibration measurements can be obtained by the PBS system 100 to provide an indicator of the health of rotating machinery, for example engine blades in a turbine engine 210. The PBS system 100 can be installed by placing the PBS 100, or rather placing the transmitting-sensing portion of the PBS 100 (described below), in a cavity filled with radar transparent material (e.g. ceramic, plastic, or non-metallic composites). Sensing signals can then be "piped" via waveguide, cable or other standard conduit for microwave energy into the engine 210 to sense engine vibration. By placing the PBS system 100 or sensing portion in the cavity, the sensing is non-intrusive, unaffected by interference, and capable of measuring vibrations deep within the engine 210. As indicated in FIG. 2, the signal output from the PBS system 100 can be interpreted to provide information about the condition of the blade. For example, a measurement that indicates a blade is closer to the sensor can indicate that a blade is lengthening or loosening from its attachment point. Further, a delayed or early signal relative to the periodicity of the other signals can indicate that a blade is bent or vibrating. This measurement is taken directly, in one implementation, by transmitting signals to the edge of the blade and receiving a reflected signal.

FIG. 3 is another example of a vibratory measurement implementation of the PBS system 100. FIG. 3 illustrates a pump 302 that is being monitored by the PBS system 100 for excessive motion. The PBS system 100 can be mounted to any structure located conveniently nearby. This implementation highlights another advantage of the PBS system 100, that is, the detection of motion at significantly smaller scales (e.g., on the order of millimeters to micrometers) than the wavelength of the transmitted signal. Movement by various machinery, for instance, a centrifugal pump, a manufacturing lathe, or other factory, office, or laboratory equipment, can be measured to provide an indication of impending failure, the need for maintenance, or as an input to a control system, among other conditions and applications. Motion detection at these levels enables precision measurement of a variety of quantities including part size (e.g., inspection) as well as vibration measurement. As will be described below, the PBS system 100 provides for phase-modulation sensing and measurement, as opposed to Doppler-effect based measurements. The PBS system 100 can be used in virtually any sensing application with many different types of antenna or coherent phase transceivers (i.e., a transceiver with a plurality of spatially or electrically separated signal detectors), to enable unprecedented precision measurement in radar-based sensing systems.

FIG. 4 is a block diagram of the example sensing system of FIGS. 1–3, in accordance with one embodiment of the invention. The PBS system 100 comprises a sensor-detecting unit (SDU) 410 and a processing system, or signal processing unit (SPU) 420. Operations of the entire PBS system 100 can be controlled through operating software (not shown) located in the SPU 420, or networked, or integrated with, external control circuitry (not shown) implemented in hardware, software, or a combination of hardware and software. The external control circuitry can coordinate transmitting and receiving functionality of the PBS 100 with the processing functionality. The SDU 410 can be a transceiver-type device using transmitting signal sources such as a Gunn oscillator, digital resonance oscillator detector, or other microwave signal generating source, along with a receiver consisting of a diode, mixer, or other phase detection device, among others. The SDU 410 preferably emits microwaves directed orthogonally at the target object. The target object, as indicated above, can be a vibrating object, or the road surface, or other objects from which a motion measurement is desired. The reflected microwaves are received by two detectors in the SDU 410. In other embodiments, a greater number of detectors can be used in the SDU 410 to increase the amount of information pertaining to object motion and thus provide, among other benefits, enhanced measurement resolution at the output of the SPU 420. The detectors are spatially separated, preferably separated 90 degrees, to provide for, in the case of two detectors, an in-phase signal (I) and a quadrature signal (Q), as will be described in further detail below. In other embodiments, the detectors can be electrically separated and/or spatially separated.

The detected signals are forwarded to the SPU 420, which combines the two signals to produce a single signal that is representative of the displacement, or relative motion, of the targeted object, in accordance with the preferred embodiment. A two signal (e.g., an I and Q) system provides the information to uniquely define (in a mathematical sense) the relative motion. Systems with greater than two detector signals can be used as inputs to a system that provide an optimal estimate of relative motion. Thus, through phase-modulation mechanisms of the PBS system 100, and not the Doppler effect, the PBS system 100 uses microwaves to measure relative movement (or variation), of the targeted object where the movement can be on the order of the length of the transmitted wave or smaller, or greater. It will be understood and appreciated by those having ordinary skill in the art that standard signal processing hardware, software, or a combination of hardware and software used for filtering, anti-aliasing, for example filtering the demodulated output of each of the detectors, and digitizing the outputs before reaching the SPU 420, are included within the PBS system 100, although not shown.

Figure 5A:
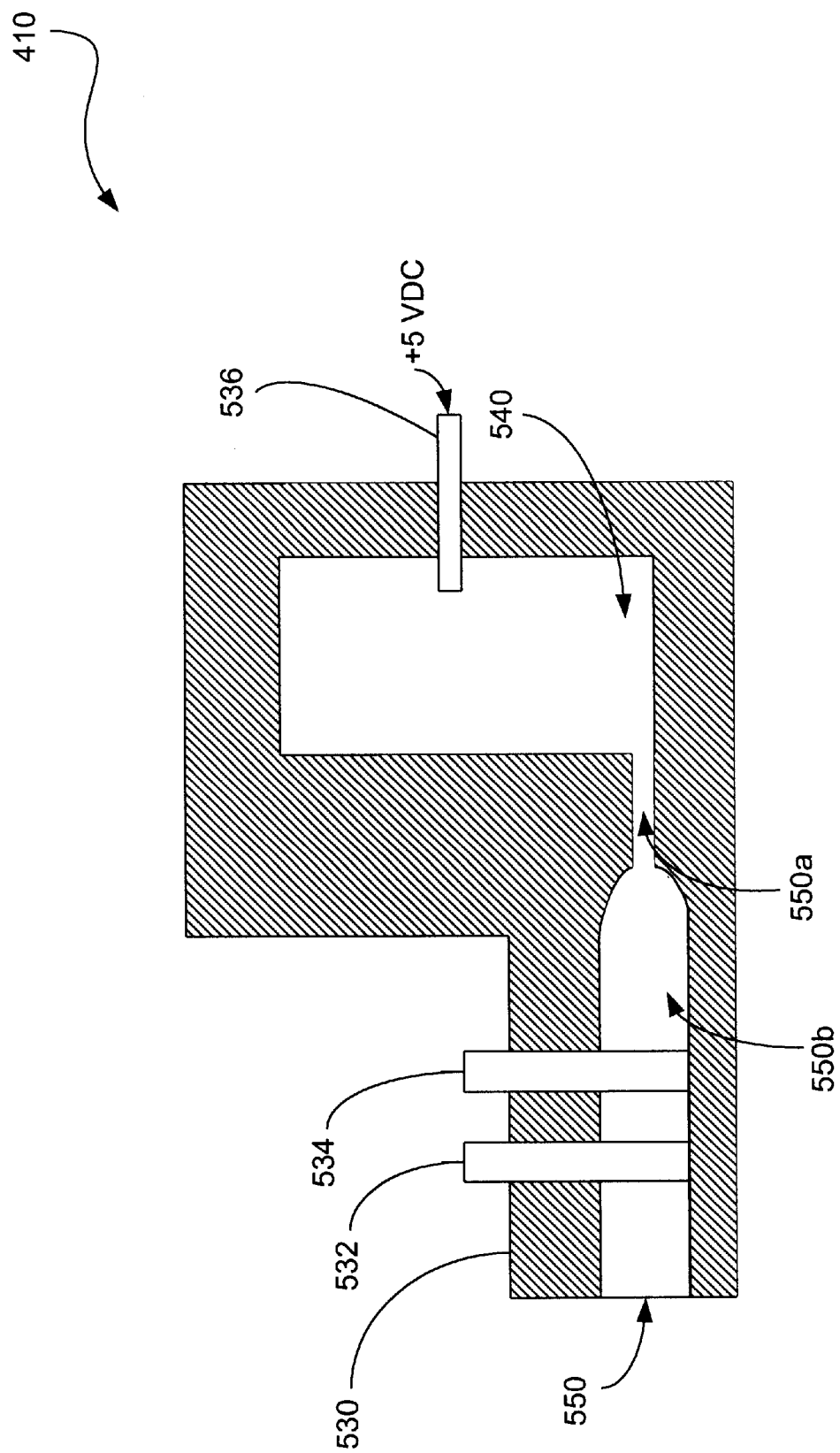
FIG. 5A is a cross-sectional side view of an example sensing-detecting unit (SDU) of the PBS system of FIG. 4, in accordance with one embodiment of the invention.

FIG. 5A is a cross sectional side view of the example SDU 410 of the PBS system 100 of FIG. 4. The example SDU 410 is a transceiver-diode. The SDU 410 includes an antenna 530, a pair of detector-diodes 532 and 534 spatially separated preferably 90 degrees apart in phase referenced to the transmitted sensing signal wavelength, and a radio frequency (RF) generating diode 536. The SDU 410 is preferably supplied with +5 VDC supply power, with the voltage source located integrally or external to the SDU 410. The antenna 530 is selected primarily based on the application. For vibration measurements, the beamwidth of the emitted signal from the antenna 530 is selected such that the targeted area is preferably as small as possible. A dielectric lens can be used, for example, to focus the beam to a narrower, or smaller, point. For terrain sensing measurement (i.e., the relative displacement between the PBS system 100 attached to, for example, a vehicle, and the target surface), the beamwidth is larger, preferably large enough to cover the area that would present a potential hazard or obstacle to the tire or track, etc. The electrical signals read from the detectors represent a superposition of reflected signals from all objects in the targeted area. Further, for close-proximity sensing, the antenna 530 can be an open-ended and dielectric loaded waveguide, or a microstrip-fed dielectric loaded slot. For more distant displacement sensing, a fixed beam planar array of printed circuit patch radiators can be used, or printed circuit board fixed arrays can be used. It will be understood that the preferred embodiments of the invention are not limited by the choice of SDU 410, and other transceiver-like devices or antennas can be used. Further, although the SDU 410 is shown as integrating the transmitting and receiving portion into a single component, as long as the reference signal emitted from a transmitting device passes across the detector diodes 532 and 534, and the reflected signal passes across the detector diodes 532 and 534, the transmitting device can be in a component or device separate from the device that receives the reflected signal.

The example SDU 410 of FIG. 5A comprises two cavities, the tuned resonance cavity 540 and waveguide cavity 550. The RF generating diode 536 is supplied with a voltage source, preferably +5 VDC, although other voltage levels can be used and are within the scope of the preferred embodiments, depending upon the type and power levels of the RF generating diode 536 in various implementations of the PBS system 100. The RF generating diode 536 emits RF energy into the tuned resonance cavity 540, which causes RF signals of a tuned frequency and harmonics of the tuned frequency to resonate within the resonance cavity 540. Connected to resonance cavity 540 is waveguide cavity 550, which has a small diameter portion 550*a* and a large diameter portion 550*b*. The small diameter portion 550*a* is a diameter that is selected to a single defined frequency signal (to substantially eliminate harmonics) to be transmitted from the resonance cavity 540 to the large diameter portion 550*b*. Thus, the small diameter portion 550*a* is selected to define a specific microwave frequency. As a single frequency RF signal is transmitted from the large diameter portion 550*b* to the targeted object (the object to be sensed or measured), the RF signal passes a first detector diode 534 and then a second detector diode 532 that is preferably offset by approximately 90 degrees from the first detector diode 534.

Figure 5B:
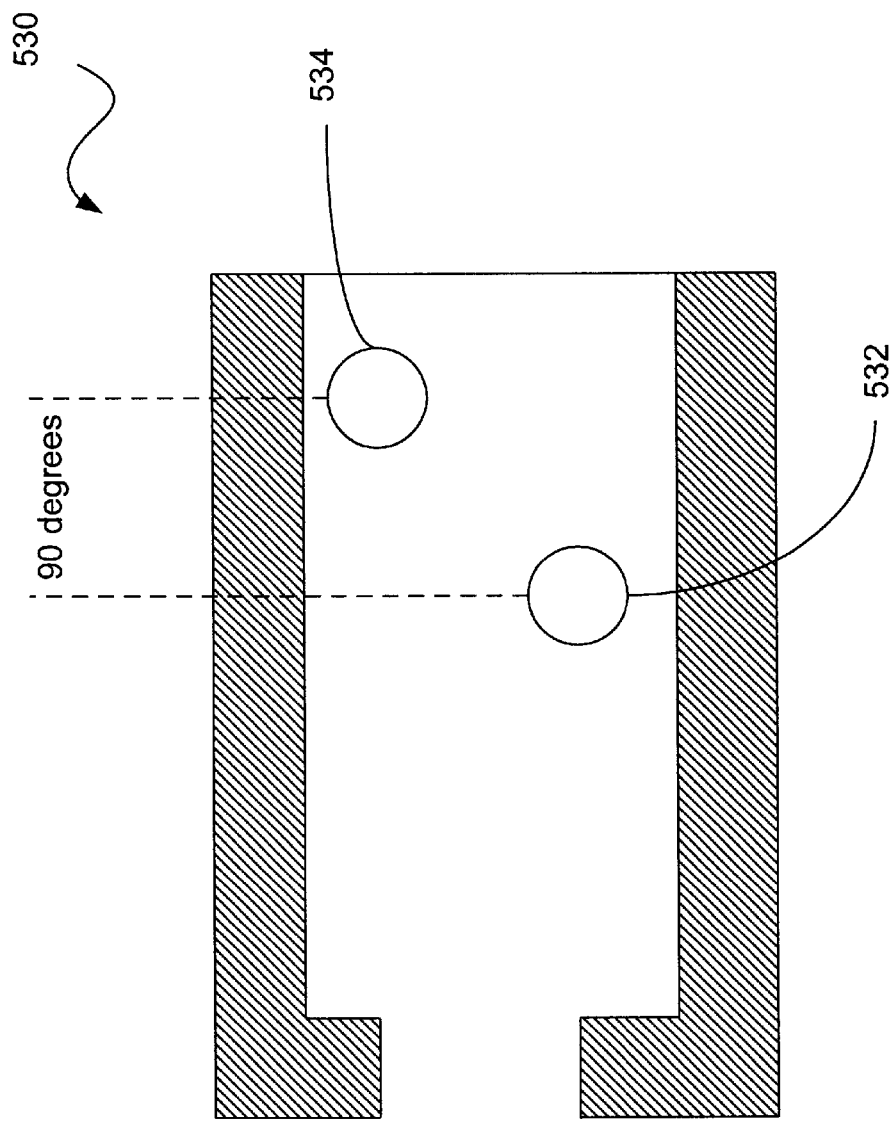
FIG. 5B is a cross-sectional plan view of the SDU of FIG. 5A, in accordance with one embodiment of the invention.

FIG. 5B is a cross-sectional plan view of the antenna portion 530 of the SDU 410 of FIG. 5A that illustrates the offset of the two detectors 532 and 534. By examining the relative phase difference between the in-phase and quadrature phase components (i.e., the reflected output signals from the first detector 534 and second detector 532, respectively), and through the appropriate mathematics, the absolute phase change caused by the relative motion of the object being sensed can be derived. Accurate tracking of the phase results in highly detailed information about small (less than one wavelength) or greater (greater than one wavelength) amounts of motion, which can be used to measure the relative motion, and thus the vibration of an object (or relative displacement of an object to the surface upon which the object is traveling) with extremely fine resolution.

Returning to FIG. 5A, after the RF signal passes the first and second detector diodes 534 and 532 respectively, the RF signal is emitted from the antenna 530 of the SDU 410. This emitted signal is referred to as the reference signal. The reference signal is directed orthogonally at a target (e.g. either downward for terrain sensing or at right-angles to the anticipated machine component movement in vibration sensing) and reflects off the target object and returns as a reflected signal to the detector-diodes 532 and 534 of the SDU 410. The detector-diodes 532 and 534, as non-linear devices, inherently perform a multiplication, or demodulation, that compares the difference between the reference signal and the reflected signal. Although described with diodes, other non-linear devices can be used to perform this demodulation. Further, combinations of diodes in different configurations can be used for increased sensitivity, such as for example, balanced mixers, double balanced mixers, crystal detectors, Schottky diodes, etc. This demodulation can be represented mathematically, as will be described below.

Figure 5C:
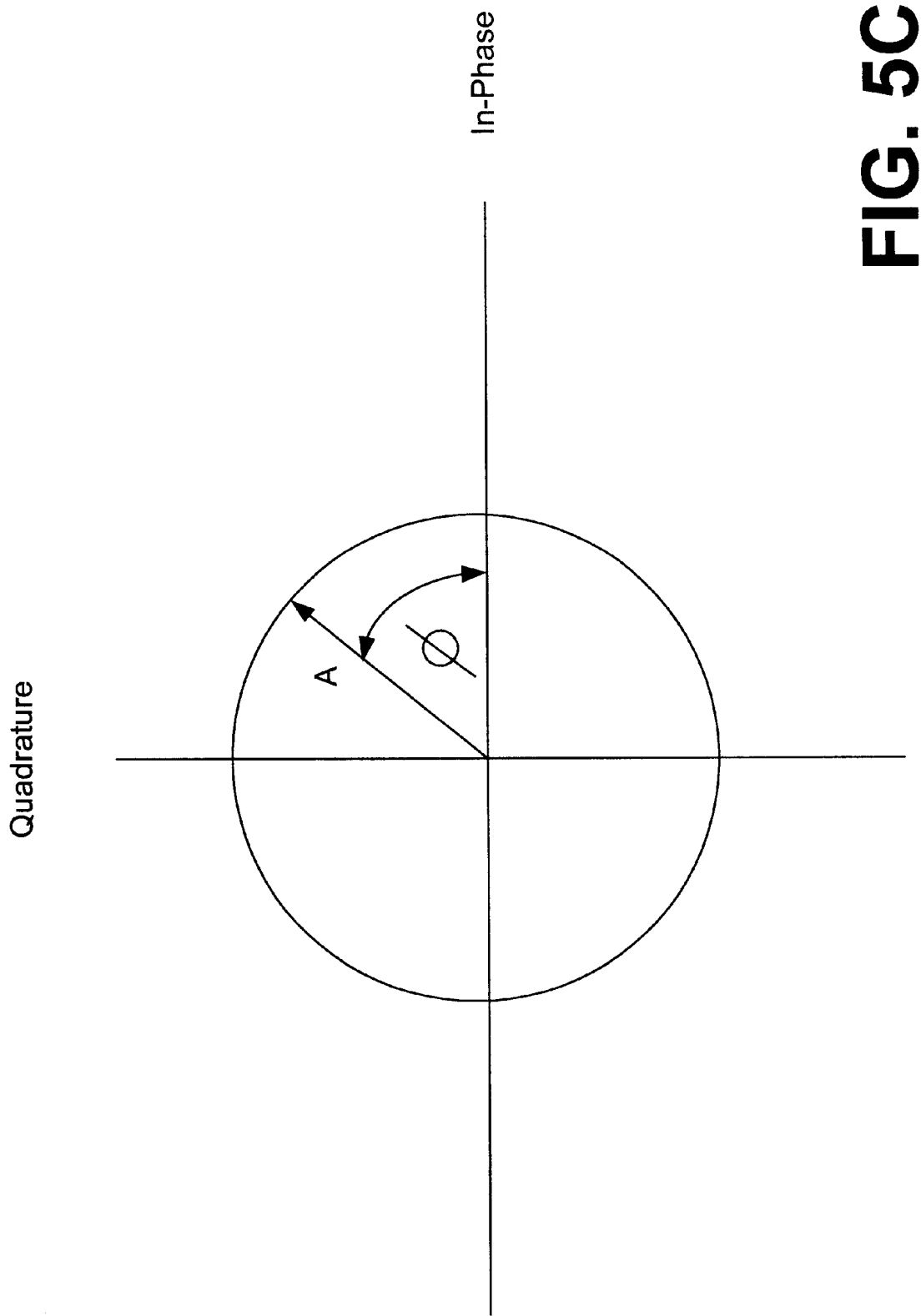
FIG. 5C is an example phasor diagram illustrating the in-phase and quadrature phase signal from the detectors of FIGS. 5A–5B, in accordance with one embodiment of the invention.

FIG. 5C shows a phasor diagram containing two axes, the I (in-phase) axis and the Q (quadrature) axis. The phasor represents the combination of the demodulated radar in-phase and quadrature signals. So, the output of each detector-diode 532 and 534 is the end result of the multiplication of the reference signal and received signal. The length of the phasor is the magnitude of the two signals. Thus, the length of the phasor is proportional to the reflected energy (radar cross section) of the thing being sensed (i.e. the sensed or targeted object). The relative phase of the phasor on the diagram is a function of the distance between the targeted object and the detector diodes. Note that the voltage of both the I and Q signals can change by at least one of two ways: (1) changes in radar cross section, which cause the length of the phasor to change, or (2) the object moves (causing the phasor to rotate on the diagram).

The phasor diagram can be represented algorithmically, or mathematically, in the logic of the SPU 420(FIG. 4), as will be described below. In the PBS system 100 (FIG. 4), the total length of the vector signal, A, represents the amount of radio frequency (RF) energy being reflected back from the object of interest. The more energy that is reflected, the longer the length of A. The phase, φ, is the distance to the object in degrees modulo 360°. For example, if the frequency being used is 24.1 GHz, then the wavelength, λ, is 1.24 cm. Therefore, for every one half wavelength, λ/2, (0.0622 cm) the object moves with respect to the PBS system 100, the phasor will rotate 360°.

Note that the phase measured by the PBS system 100 is actually twice the amount the object moves due to the fact that the reference and reflected signal must travel through both the transmit and receive paths. If the object moves one quarter wavelength (90°), then the transmit wave travels 90° with respect to the transmit path, and an additional one quarter wavelength on the receive path after the signal is reflected off the object, yielding a total phase change of λ2 (180°). Since the phase is detected modulo 360°, the actual distance, or displacement (range) to the object is not known, but any relative motion can be accurately measured. For example, if the object is at a distance of λ from the PBS system 100, the phasor will be at 0° (twice the 180° phase change). If the object is at a distance of 4λ, the phasor will again be at 0°. In moving from λ to 4λ, the phase has rotated completely around six times before coming to rest again at 0°.

The motion of the phasor will be interpreted by the PBS 100 in a slightly different manner depending on whether the targeted object is moving through more than or less than one wavelength. If the targeted object moves more than a wavelength, the traditional Doppler effect is in place. In the Doppler effect equation, the output signal is dependent upon the transmitted frequency. This is because an object is typically moving straight towards the sensor (like a car moving towards a police radar). The Doppler effect output is a frequency proportional to the number of wavelengths that the vehicle moves through per second. For every one half wavelength (note that the total path length is doubled because of transmit and receive paths), the phasor rotates through 360 degrees. If you look at either the I or Q signal alone, one 360 degree rotation results in one cycle of a sinusoid. Therefore, if the transmitted wavelength is longer, it takes longer in time to go through the 360 degrees and there are fewer sinusoids per second, thus the Doppler shift is lower. Therefore, a car giving you a 1000 Hz Doppler on a 24.1 GHz radar is moving at 1000*2*1.24 cm per second.

Now, when interrogating (sensing) a vibrating object (herein, a vibrating object will be understood to mean an object moving through less than one wavelength) it moves in one direction, slows down and stops and then moves the other direction. It repeats this, moving back and forth. If the object is moving greater than a wavelength in this manner, the Doppler effect is still there and thus the PBS system 100 will, in one embodiment, "count" how many times the phasor goes through 360 degrees.

If the object is moving less than a wavelength, the in-phase and quadrature signals are not complete sinusoids, so a Doppler shift cannot typically be measured. However, the PBS system 100 evaluates the phase of the vector (as will be described below) to track motion of the targeted (e.g. vibrating) object. In short, by tracing out the derived phase signal using the logic of the PBS 100, when the motion is less than a wavelength, the result is substantially the same frequency that the object is vibrating at, independent of the transmitted carrier frequency. Further, as will be shown below, the transmitted wavelength also allows the phase diagram to be scaled to the actual physical displacement of the targeted object.

Figure 6A:
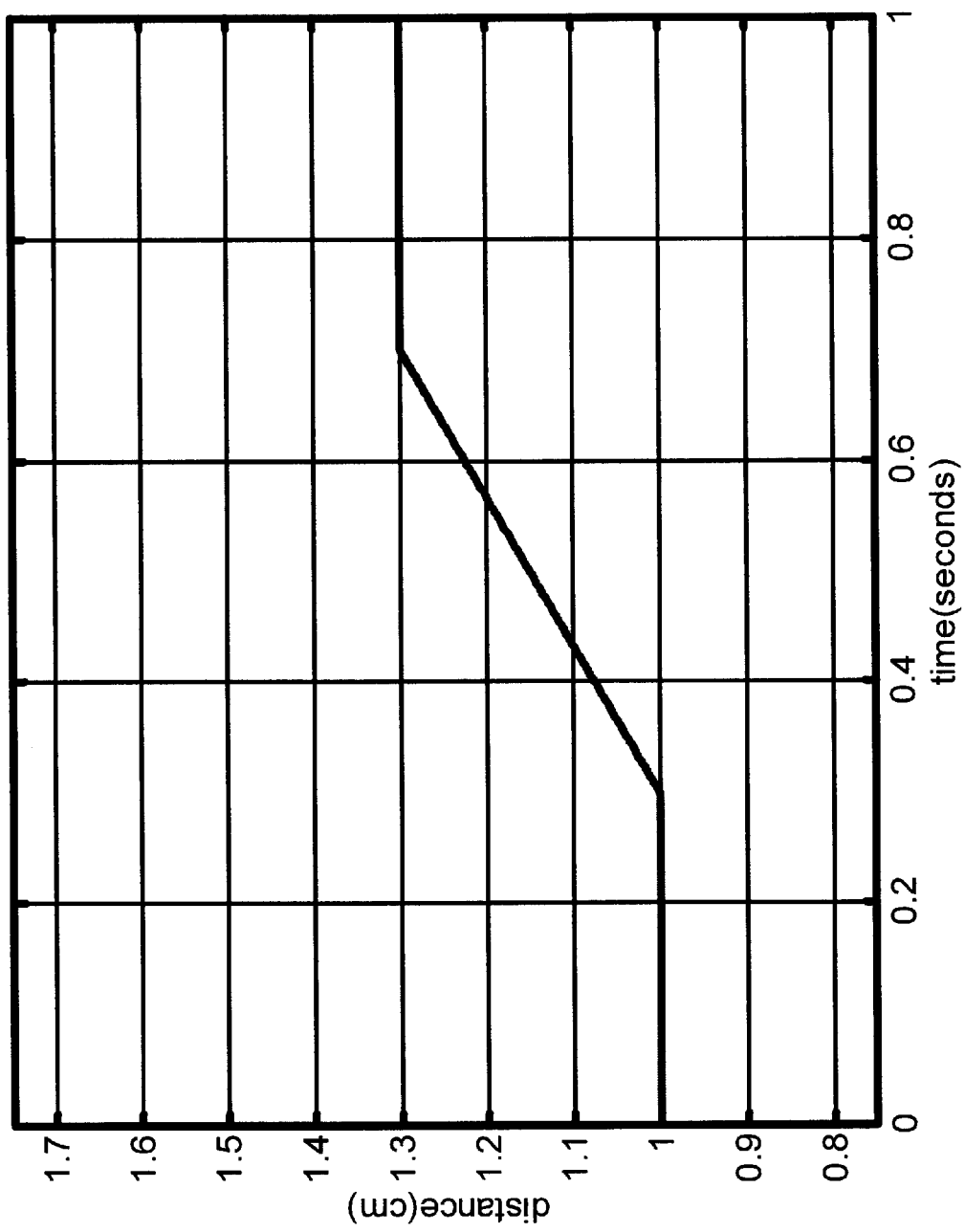
FIGS. 6A–8D are diagrams that include distance versus time plots corresponding to the movement of a sensed object, output signals of the SDU, and the internally generated phasor plots and phase shift versus time relationships generated by the signal processing unit (SPU) of the PBS system of FIG. 4, in accordance with one embodiment of the invention.

FIGS. 6A–8D illustrate the concept of using two offset signals (i.e., in-phase and quadrature signals) to produce a combined signal representative of relative displacement, or relative motion, of the targeted object (i.e., a displacement signal). The PBS system 100 (FIG. 4) in these examples will be used to detect motion of an object, for example, the movement of the centrifugal pump of FIG. 3. Although described for motion of less than one wavelength, it will be understood by those having ordinary skill in the art that motion of the targeted object (or relative to the targeted object) through greater than one wavelength can be evaluated by the PBS system 100 in accordance with the below description, with the addition of a phasor rotation count as described above. In FIGS. 6A–8D, the PBS system 100 will not be attached to the pump. FIG. 6A represents a distance versus time plot under a first scenario for the PBS system 100. In this situation, the pump is at rest (i.e. not activated), then the pump is activated causing movement toward the PBS system 100, and then the pump returns to rest (i.e. the pump stops moving). What is shown in FIG. 6A is a distance versus time plot for the pump that the PBS system 100 is measuring. As shown, the pump does not move at all until 0.3 seconds. Subsequently, the pump is turned on and moves toward the PBS system 100, and then stops at 0.7 seconds. Thus, the total distance traveled is 0.3 centimeters.

Figure 6B:
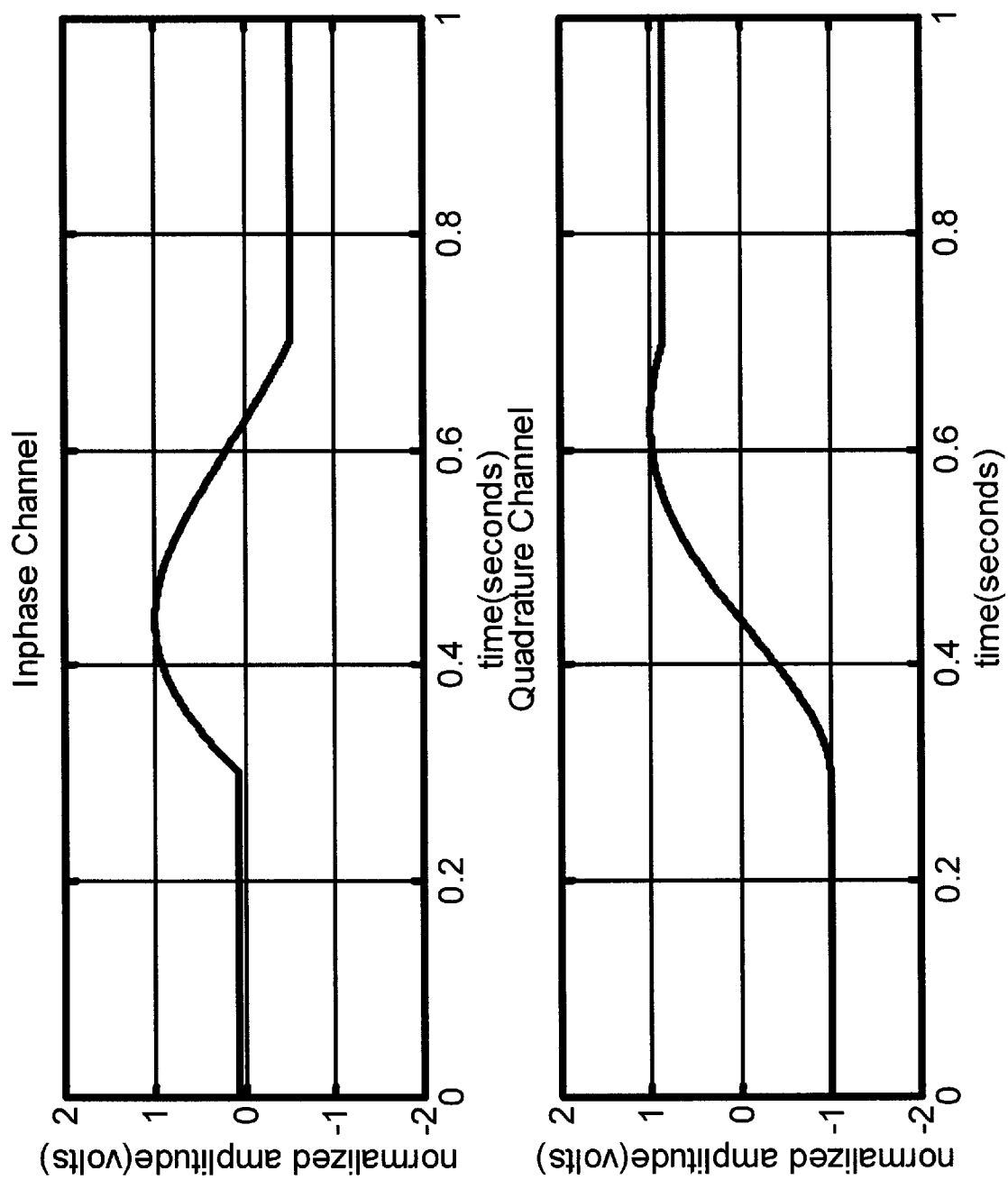
Figure 6C:
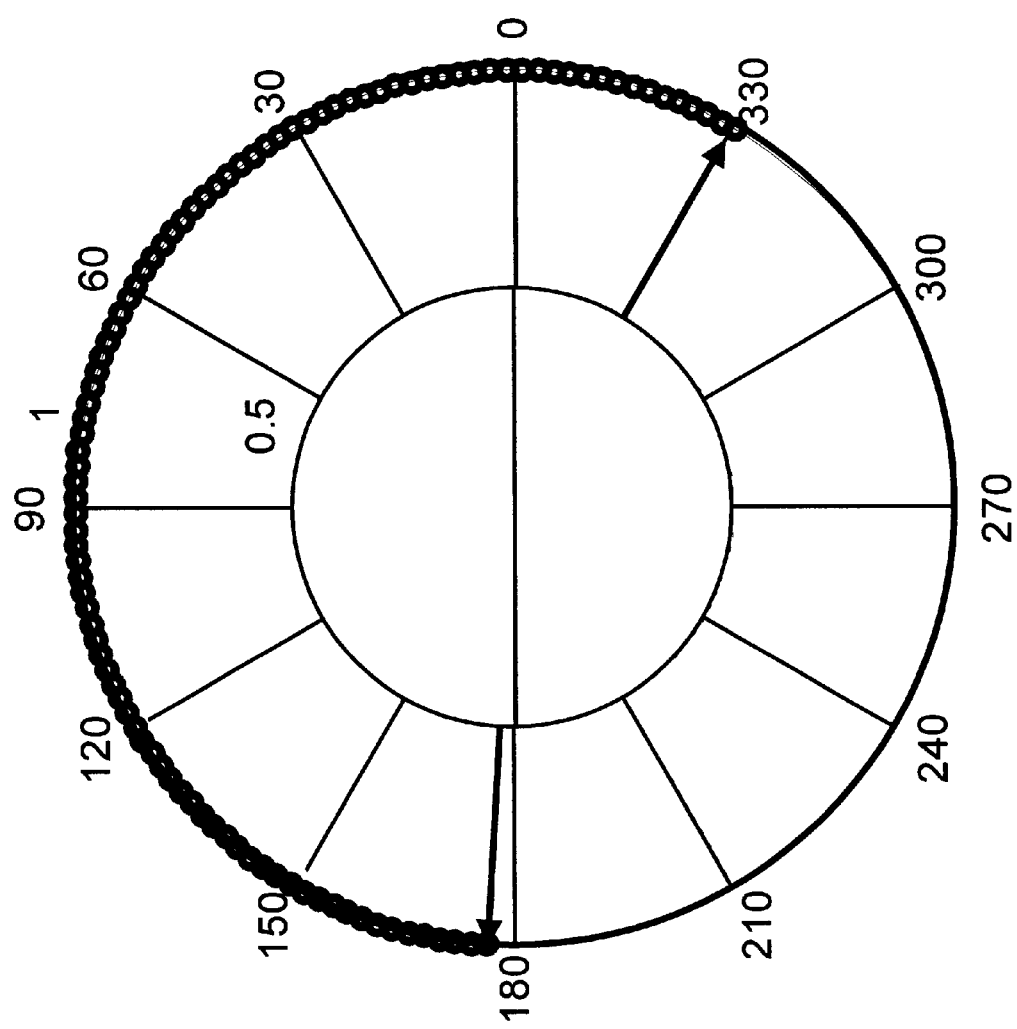
Figure 6D:
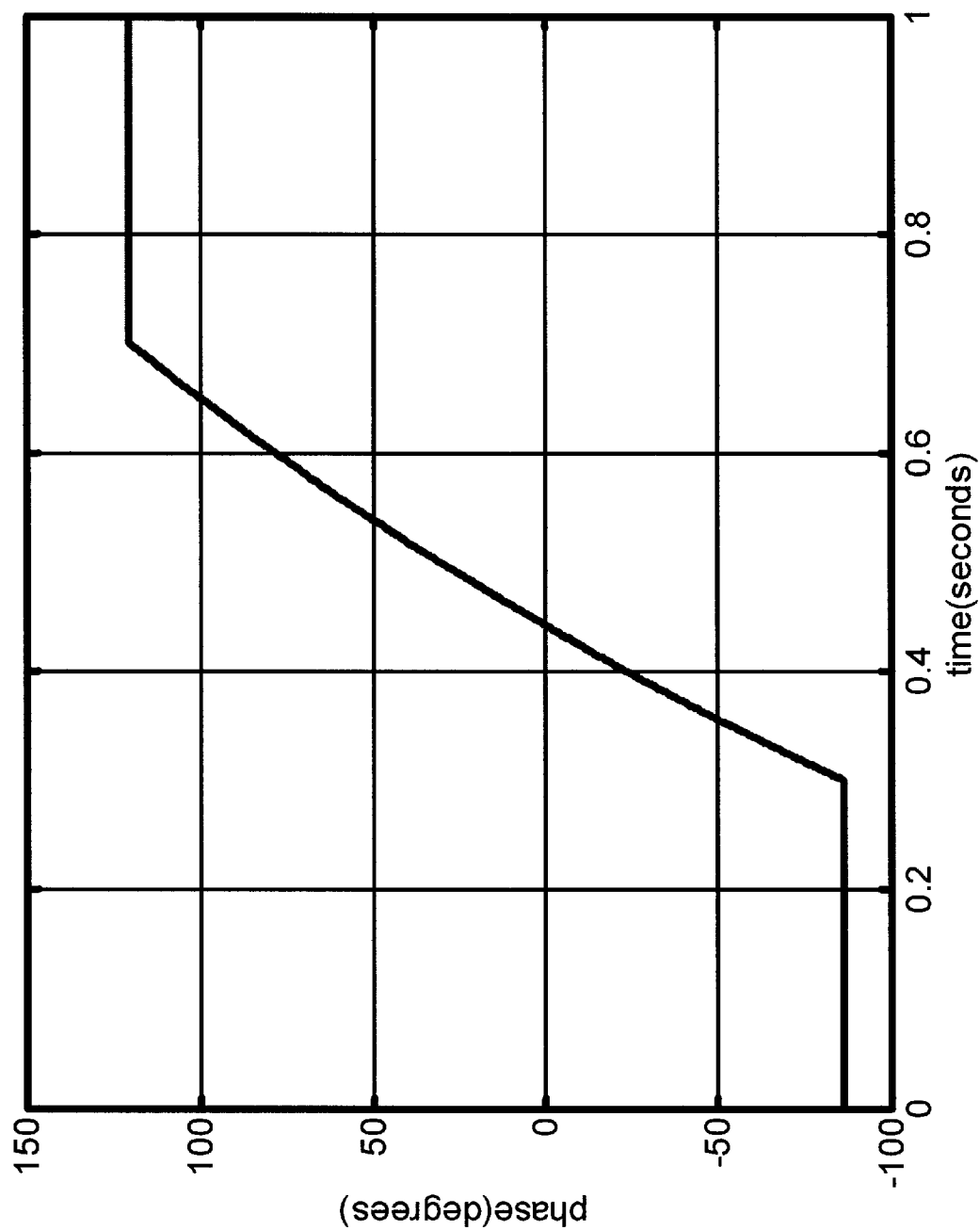

FIG. 6B shows plots of the raw in-phase and quadrature output signals from the detector-diodes 532 and 534 of the SDU 410 (FIG. 5A) of the PBS system 100 (FIG. 4). As shown, there is a constant DC signal until the pump is activated and begins to move, at which time the voltage begins to change for both signals at 0.3 seconds and then stops and stays at a constant DC signal level at 0.7 seconds. FIG. 6C illustrates a polar plot showing the vector positions of the output signals at each of the detector-diodes 532 and 534 of the SDU (FIG. 5A). Thus, FIG. 6C reflects the change in phase corresponding to the in-phase and quadrature signals shown in FIG. 6B. In the example shown in FIG. 6C, the distance of the pump from the sensor starts at 330 degrees with respect to the PBS system 100, and then, the pump moves counterclockwise from 330 degrees to almost the 180 degrees point on the plot, resulting in almost 210 degrees of travel. The ratio of 210 degrees to 360 degrees is the same as the ratio of distance moved to 2 times the wavelength. FIG. 6D illustrates a phase versus time plot generated by the SPU 420 of the PBS system 100 (FIG. 4), which shows the output after the SPU 420 of the PBS system 100 (FIG. 4), in accordance with the preferred embodiment, which is a measurement of the motion scaled to degrees (which can then be scaled to distance if desired, using the ratio as described above). Note that the pump motion correlates with the output of the SPU 420 of the PBS system 100 (FIG. 4).

Figure 7A:
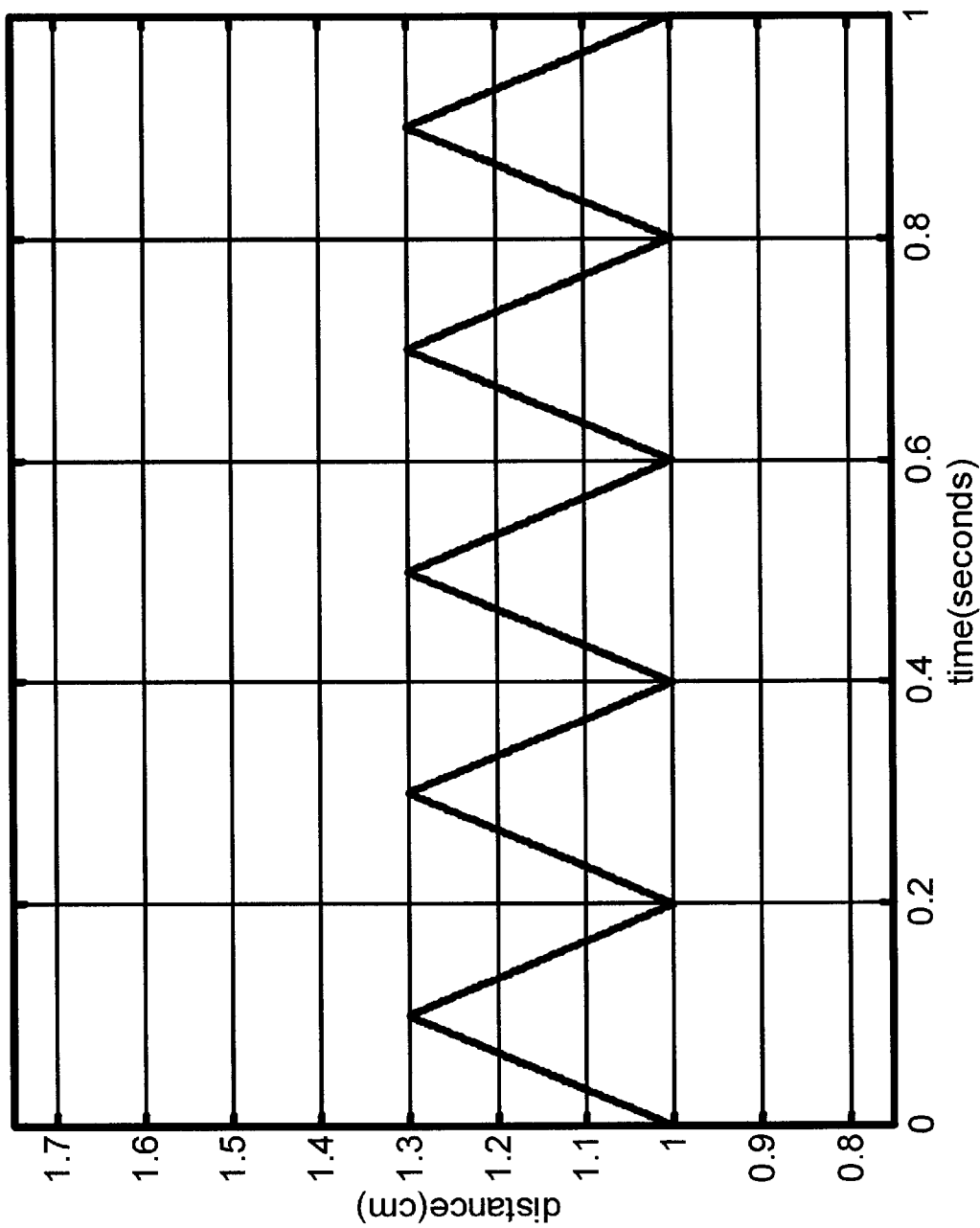
Figure 7B:
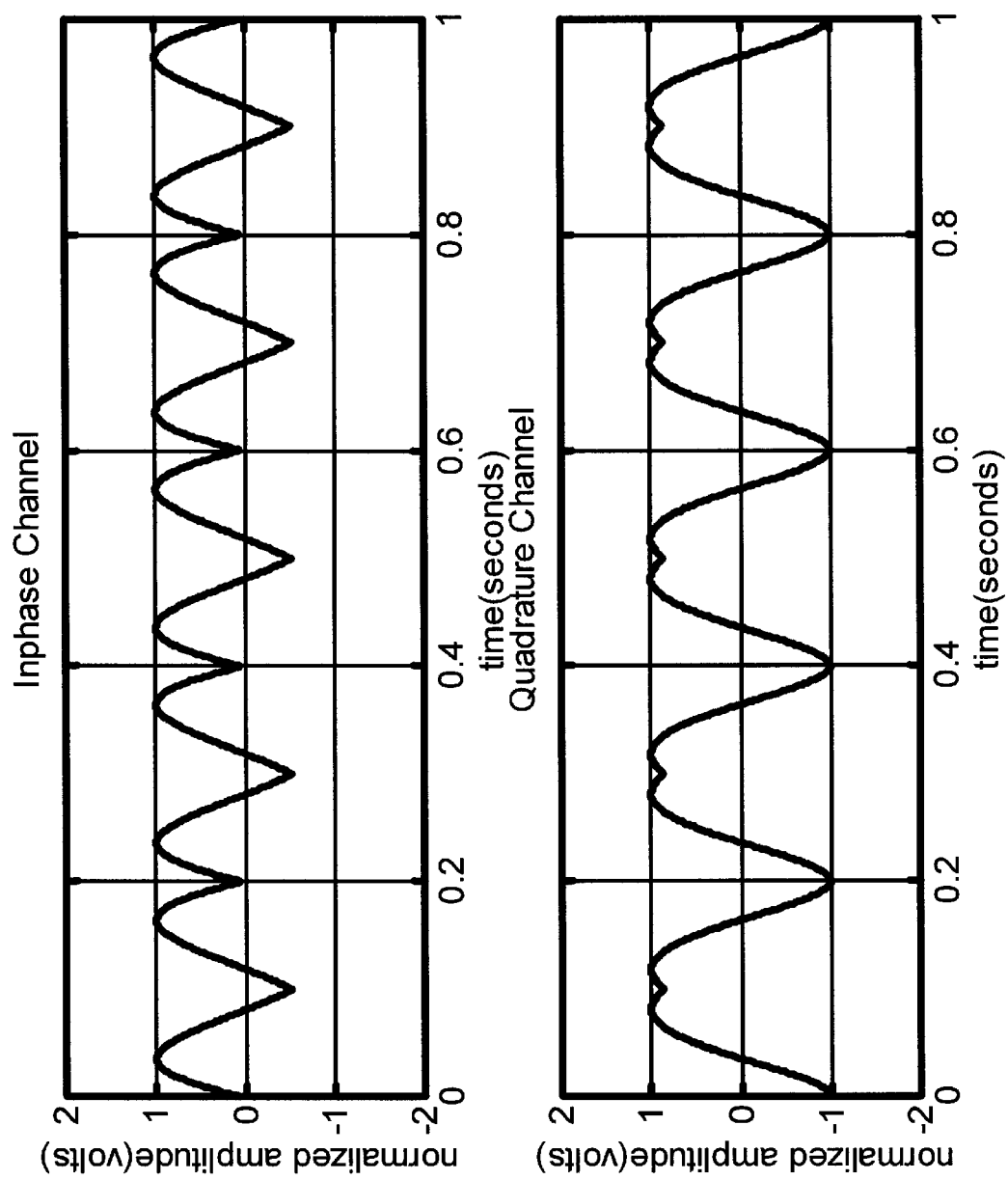
Figure 7C:
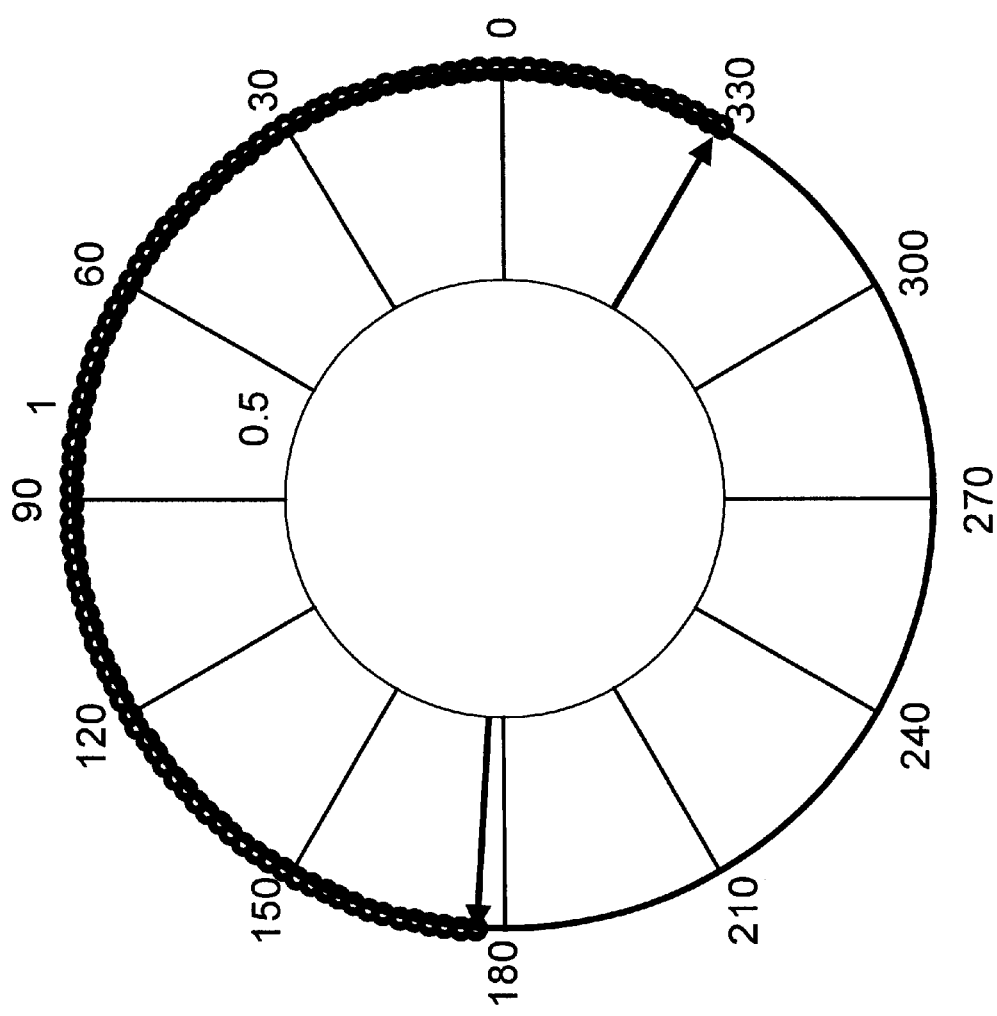
Figure 7D:
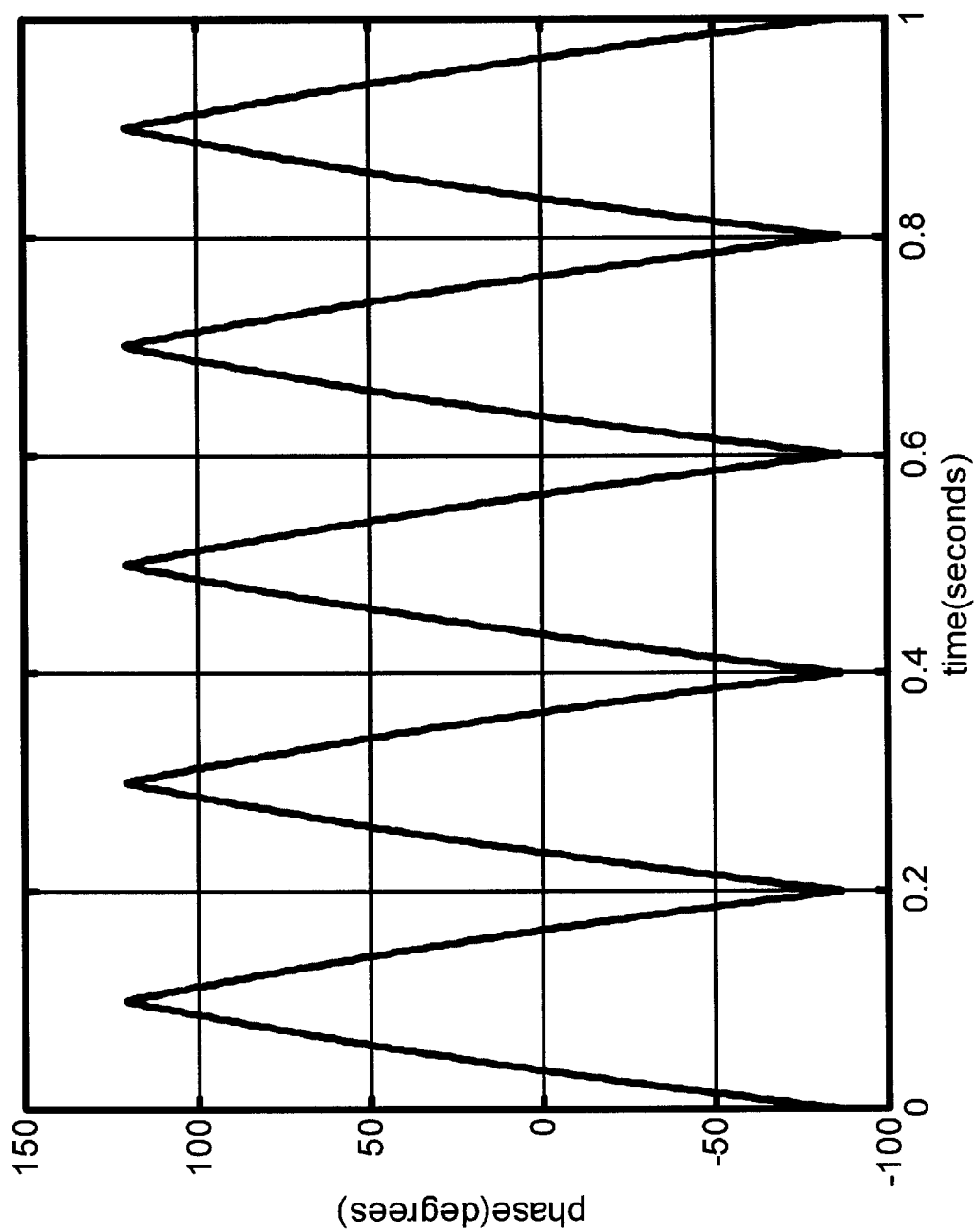

FIG. 7A, like FIG. 6A, illustrates a second scenario, where the pump moves towards, and away from, the PBS system 100 in a cyclical, or sawtooth, motion. One example of this movement can be where the pump is actually vibrating due to a defective bearing condition, among other reasons. Note that the pump is traveling the same distance as in the first scenario, yet the PBS system 100 senses each movement, as indicated by the constantly changing in-phase and quadrature signals of FIG. 7B. The polar plot of FIG. 7C reflects the fact that the same distance is traveled as in the first scenario of FIGS. 6A–D. FIG. 7D illustrates that the output of the SPU 420 of the PBS system 100 (FIG. 4) matches the movement of the pump, except scaled in degrees.

Figure 8A:
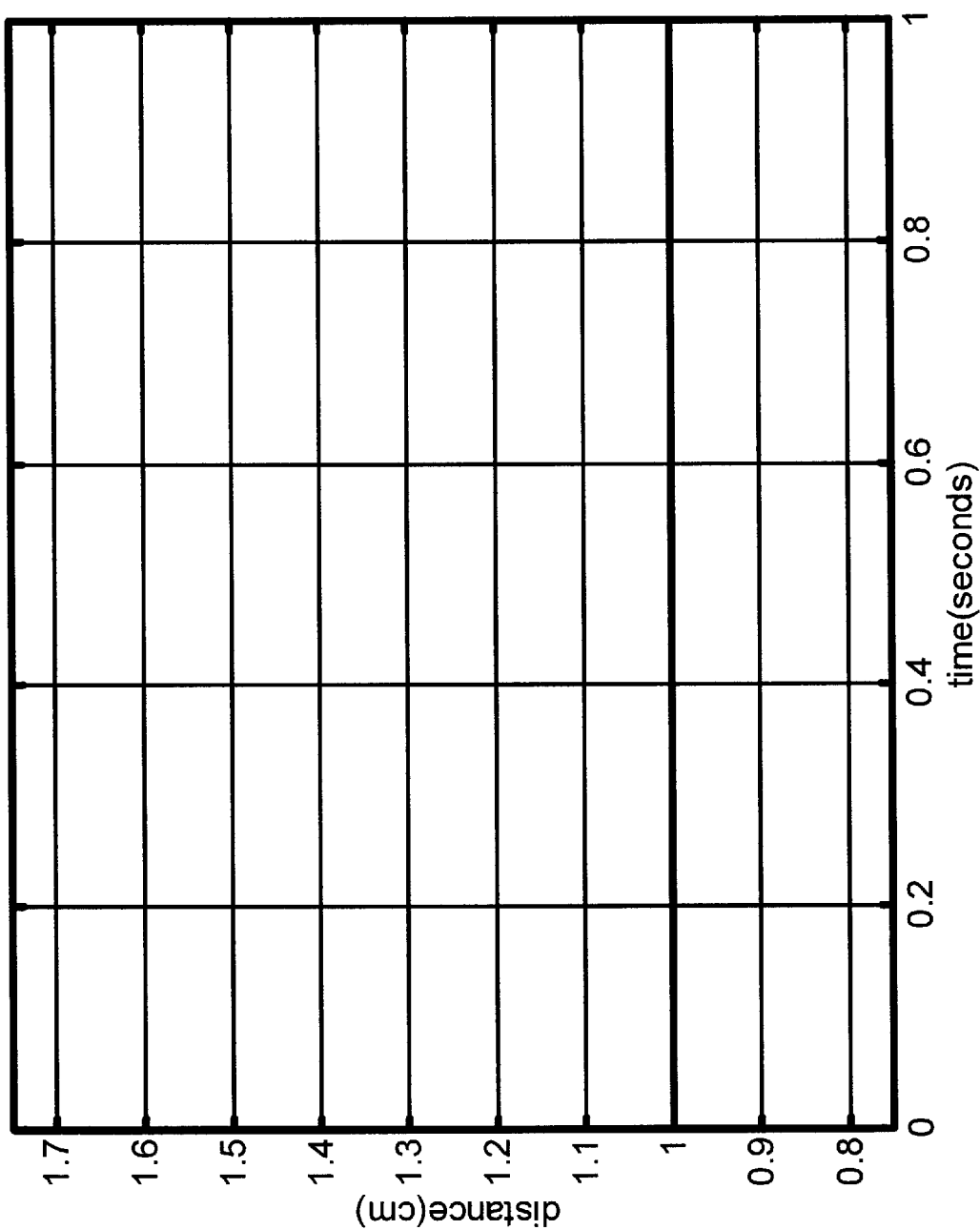
Figure 8B:
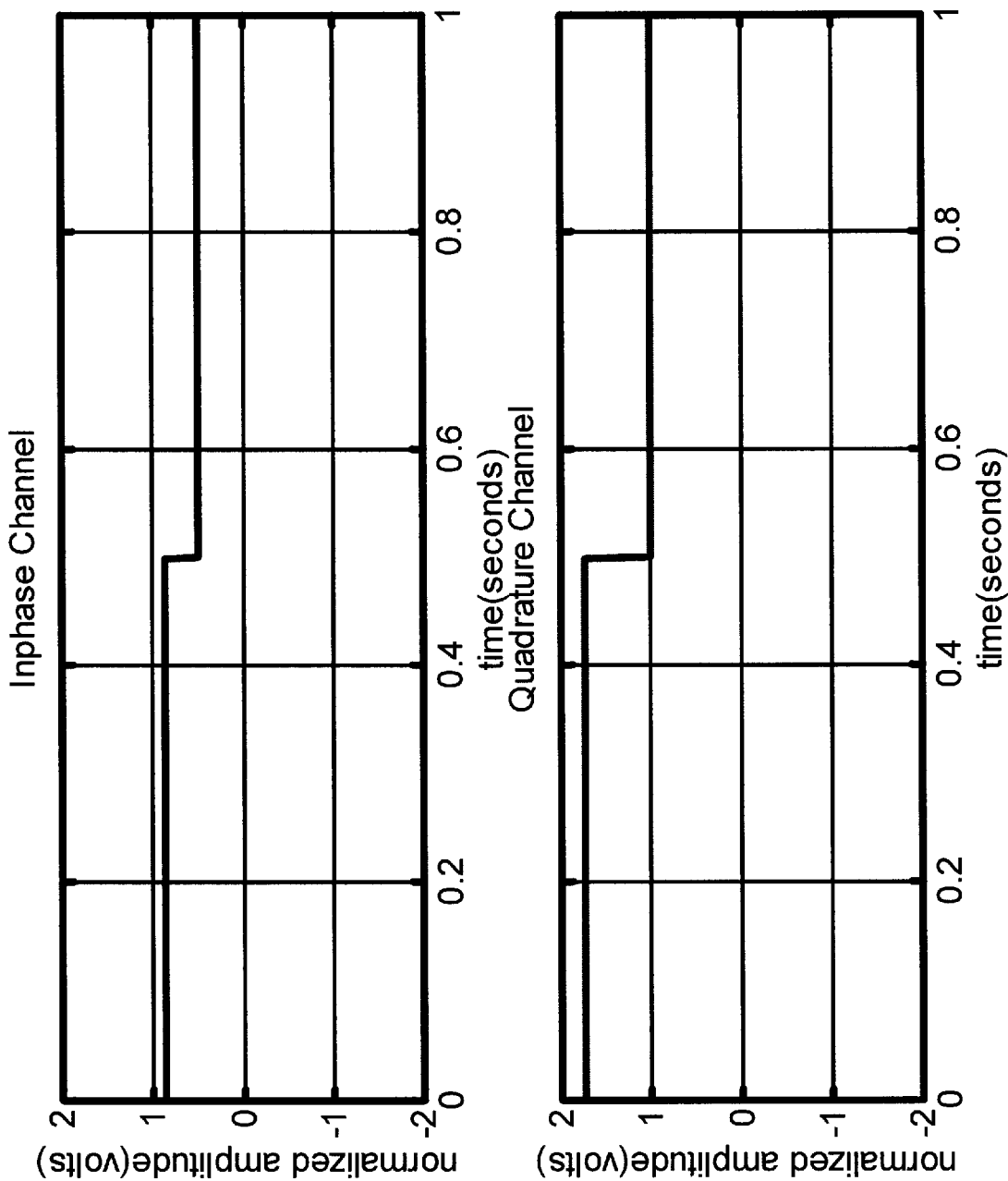
Figure 8C:
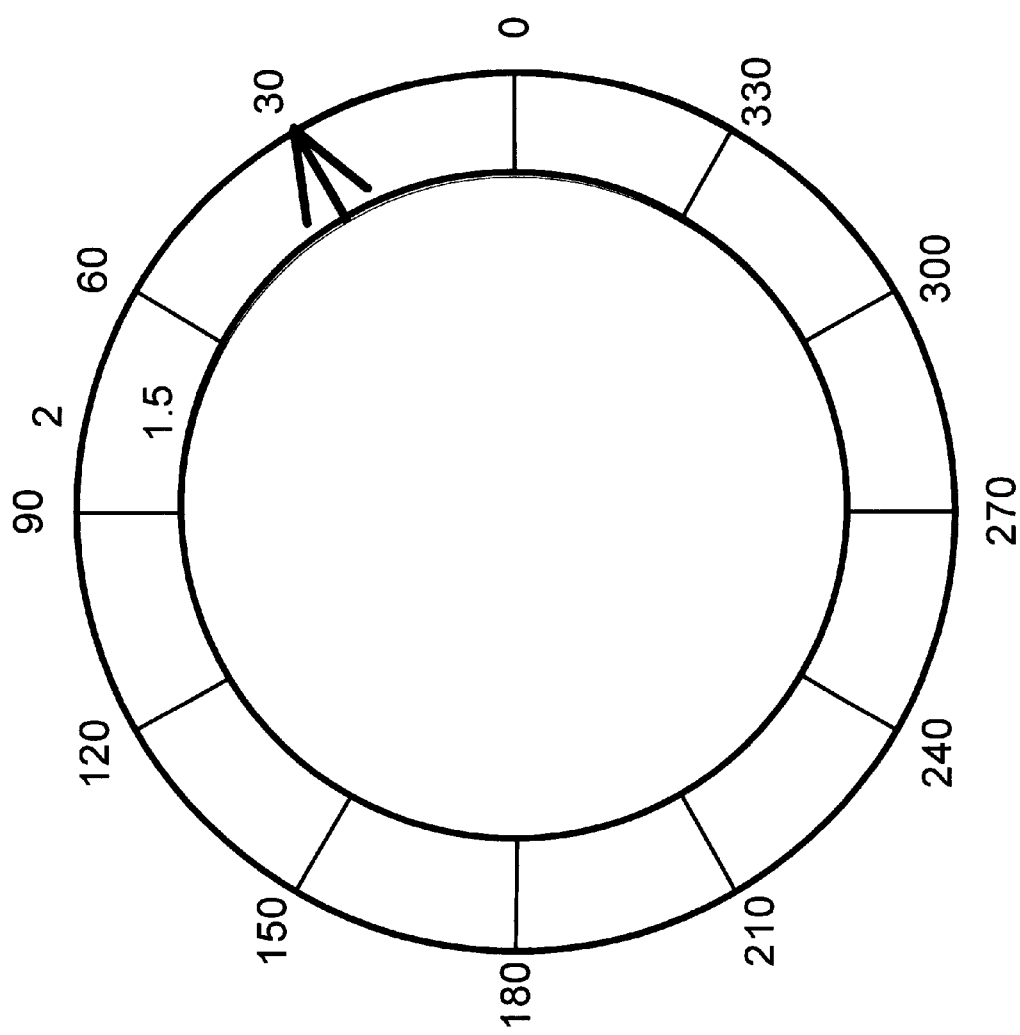
Figure 8D:
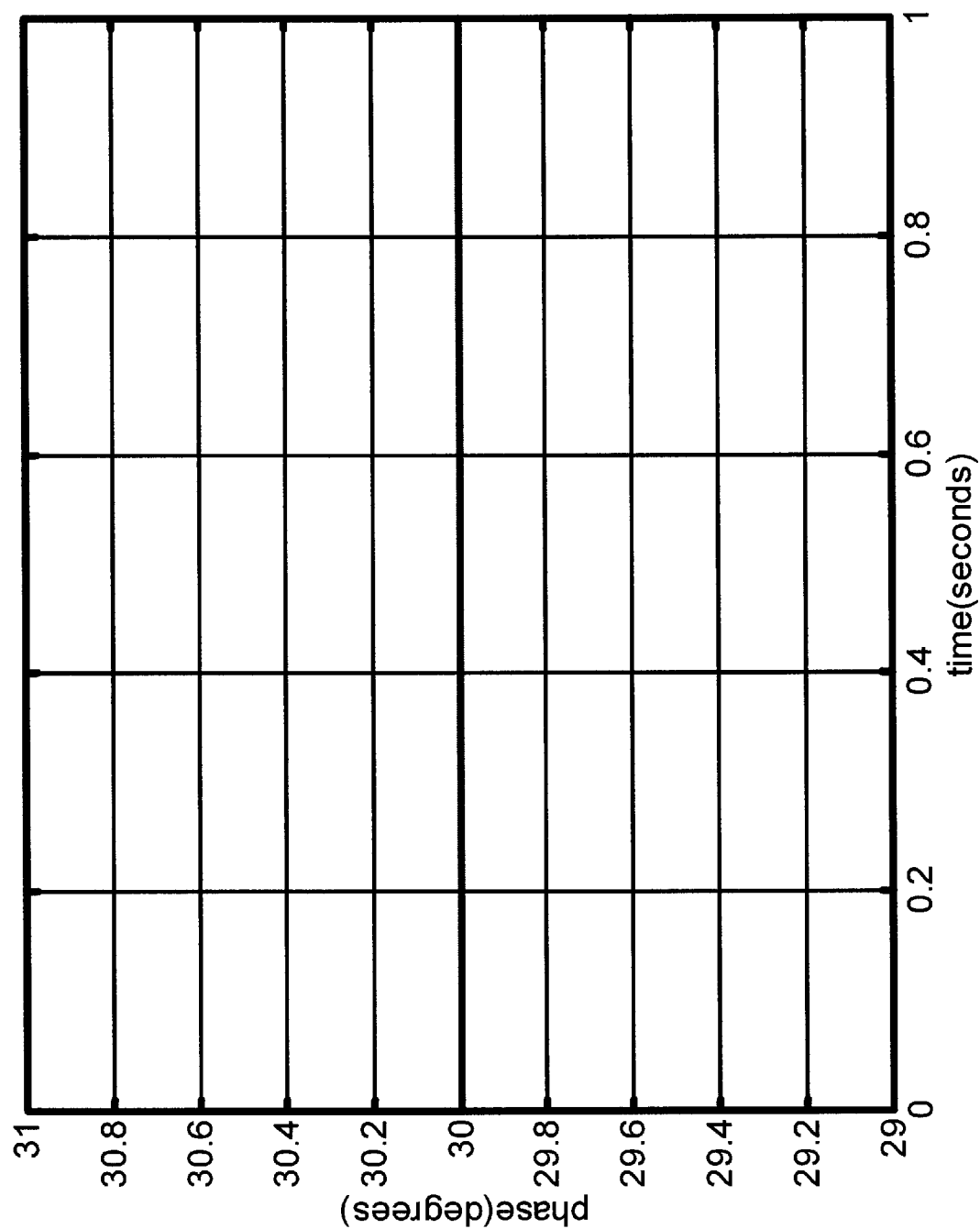

FIG. 8A illustrates the scenario where there is no motion toward the PBS system 100, but a sudden change in radar cross section at 0.5 seconds. Such a scenario can not be adequately illustrated in a distance versus time plot, as shown by the straight line in FIG. 8A. Such an event can occur where there is a change in road surface (in the example of terrain sensing) or material change (e.g. the addition of a weather shield on the pump surface) that effects the signal absorption or reflectivity, but the distance from the PBS system 100 to the targeted object (e.g., the pump) is unchanging. The radar cross section changes at 0.5 seconds (e.g. addition of a polycarbonate weather shield on the pump that has a different reflectivity than the pump body). Thus, the PBS system 100 is sensing a lower reflective surface to a higher reflective surface. There is, accordingly, a change in the in-phase and quadrature signal as well, as illustrated in FIG. 8B. FIG. 8C shows that the vector plot is unchanged, except for a change in magnitude (higher reflective surface and thus stronger signal (or amplitude A from FIG. 5C)). However, because the PBS system 100 is only measuring phase, or rather change in phase, the processed output does not change with respect to the radar cross section.

Due to the small displacements and the transmit frequencies typically being used, the raw output of the PBS system 100 (FIG. 4) (e.g. from the detector diodes 532 and 534 of the SDU 410 (FIG. 5A)) can be composed, for example in a vibration measurement, of the actual vibration frequencies and the additional harmonics. Note that under these conditions (or in terrain sensing applications (FIG. 1)) with an orthogonally located target there is no classical Doppler effect where the received signal is dependent upon the transmit frequency being used. To show this effect, one can examine the output of one of the detector diodes 532 and 534 (FIG. 5A) (either the in-phase or quadrature signal component) of the PBS system 100 for a single sinusoid. Assume in this example, the vibration measurement application (although the below described mathematical explanation can be equally applied to the terrain sensing application of FIG. 1 or other applications for the PBS system 100), such as that depicted in FIG. 3, and further assume that the PBS system 100 has transmitted the following reference signal, $x(t)$, $$x(t) = A \cos(2\pi f t). \quad \text{Eq. 1}$$

Assuming a transmitted amplitude of A (note that A takes into account the transmitted power, antenna gain, and all transmitter losses), a transmit frequency of, and time, t, in seconds, the received signal (reflected signal) at first detector diode 534 (FIG. 5A), $y(t)$, reflected from the targeted object is $$y(t) = B \cos(2\pi f t + \phi(t) + \alpha). \quad \text{Eq. 2}$$

The received signal (reflected signal) at second detector diode 532 (FIG. 5A), being offset 90°, will be the above function with cosine replaced with sine. The amplitude B of the received (reflected) signal can be evaluated via a standard radar equation. The time varying phase term $\phi(t)$ represents the change in phase of the received signal due to the motion of the targeted object. This motion is centered around the bias term, $\alpha$. The $\phi(t)$ is a time varying sinusoid representing the motion or variation of the object being examined while the constant, $\alpha$, represents the physical phase difference (range in modulo $2\pi$ radians) between the PBS system 100 and the targeted object. Alpha ($\alpha$) is the phase represented by the total number of complete wavelengths the object is away from the detector-diode. Therefore, the total distance away is $\alpha + \phi(t)$, where $\phi(t)$ is the "subwavelength" portion of the motion. The signal from the other diode would be $y(t)$ shifted by 90 degrees.

Once the signal has been received at each of the detector diodes 532 and 534 (FIG. 5A), the next step is demodulation. The detector diodes, as indicated above, inherently perform a demodulation, or multiplication, of the reference signal that passes each detector diode 532 and 534 (FIG. 5A) in the larger diameter portion 550b of the tuned cavity 550 (FIG. 5A), and the reflected signal. This multiplication can be represented by conventional trigonometric functions. Looking at the first detector-diode 534 (FIG. 5A), the output of this multiplication can be represented as follows:

$$S_1(t) = [A\cos(2\pi f t) \times B\cos(2\pi f t + \phi(t) + \alpha)] \quad \text{Eq. 3}$$

$$= [AB/2\cos(2\pi f t + 2\pi f t + \phi(t) + \alpha] +$$

$$[AB/2\cos(2\pi f t - (2\pi f t + \phi(t) + \alpha))]$$

$$= AB/2[\cos(-\phi(t) - \alpha) + AB/2\cos(4\pi f t + \phi(t) + \alpha)]$$

$$= AB/2\cos(\phi(t) + \alpha) \quad \text{(after low-pass filtering out the } 4\pi f t \text{ term.}$$

Using similar trigonometric functions, the output at second detector-diode 532 (FIG. 5A), $S_2(t) = AB/2 (\sin(\phi(t) + \alpha))$. Thus, the received signal is mixed with the transmit signal and the double frequency term is filtered out to yield $S_1(t)$, the output of the first detector diode 534 (FIG. 5A) of the PBS system 100 (FIG. 4). Using trigonometric identities the equation for $S_1$ becomes:

$$S_1(t) = AB/2 ((\cos \phi(t))(\cos \alpha) - (\sin \phi(t))(\sin \alpha)). \quad \text{Eq. 4}$$

For simplicity, let the constant $C = AB/2$. Next, it can be shown that an oscillation of $f_m$ Hertz (Hz) from the targeted object manifests itself in the output of the PBS system 100 exactly, or substantially, at the same frequency of motion. Let the time varying phase be $$\phi(t) = \beta \sin(2\pi f_m t), \quad \text{Eq. 5}$$

where $\beta$ corresponds to the maximum phase change (in radians) through which the object moves and can effectively be considered the modulation index as is used in wide-band frequency modulation (FM) analysis. Substituting $\phi(t)$ into equation 4 for $S_1$ yields:

$$\phi S_1(t) = C(\cos(\beta \sin(2\pi f_m t)) \cos \alpha - \sin(\beta \sin(2\pi f_m t)) \sin \alpha). \quad \text{Eq. 6}$$

Rewriting $S_1(t)$ in terms of complex exponentials yields $$\phi S_1(t) = C(Re(e^{j\beta \sin(2\pi f m t)}) \cos \alpha - Im(e^{j\beta \sin(2\pi f m t)}) \sin \alpha). \quad \text{Eq. 7}$$

Next, writing the complex exponentials in terms of standard Fourier series expansions results in the following equation $$S_1(t) = C(Re(\Sigma C_n e^{jn2\pi f t}) \cos \alpha - Im(\Sigma C_n e^{jn2\pi f t}) \sin \alpha). \quad \text{Eq. 8}$$

Note that the summations above are from negative infinite to positive infinite. The Fourier coefficients, $c_n$, are $$c_n = f_m \int e^{j\beta \sin(2\pi ft)} e^{-jn2\pi f_m t} dt = J_n(\beta),\qquad \text{Eq. 9}$$

which is an $n^{th}$-order Bessel function of the first kind, where the integration occurs from negative (½)fm to positive (½)fm. Substituting this result into equation 8 generates:

$$S_1(t) = C(\text{Re}(J_n(\beta)e^{jn2\pi ft})\cos\alpha - \text{Im}(J_n(\beta)e^{jn2\pi ft})\sin\alpha) \qquad \text{Eq. 10}$$
$$= C(J_n(\beta)\cos(2\pi nf_m t)\cos\alpha - J_n(\beta)\sin(2\pi nf_m t)\sin\alpha).$$

Finally, using the trigonometric angle-sum relationship the following relationship can be obtained $$S_1(t) = C J_n(\beta)\cos(2\pi nf_m t + \alpha). \qquad \text{Eq. 11}$$

From equation 11 it can be seen that when the PBS system 100 is interrogating a targeted object oscillating at a single frequency, the output is the sum of the vibration fundamental frequency as well as harmonically related sinusoids whose amplitude is determined by the $n^{th}$-order Bessel function of the first kind. Note that for an index of n=0, the DC offset of the signal is determined by the bias consent, $\alpha$. It is this bias constant that determines the amount of harmonic content contained in the signal.

This suggests that a single detector is capable of receiving vibration signals; however, there is the potential for significant harmonic distortion depending on the value of $\alpha$. The output of a single detector diode has a plurality of harmonics, and therefore is not an accurate representation of the motion of the object being interrogated (i.e. sensed). Note, as described above, that this is the output of a single detector diode (either 532 or 534 of FIG. 5A) using either the in-phase or quadrature detector signal. The detector diode outputs can be combined, in the preferred embodiment, to produce an output that can eliminate the harmonic content. The output of the second detector diode 532 (FIG. 5A) is:

$$S_2(t) = C J_n(\beta)\sin(2\pi nf_m t + \alpha). \text{ Eq. 12}$$

These two signals, $S_1(t)$ and $S_2(t)$, can be recombined using complex exponentials and trigonometric identifies to form the desired output, $\phi(t)$plus the bias term, $\alpha$, as follows:

$$\tan^{-1}(S_2(t)/S_1(t)) = [C\sum J_n(\beta)\sin(2\pi nf_m t + \alpha)] / \qquad \text{Eq. 13}$$
$$[C\sum J_n(\beta)\cos(2\pi nf_m t + \alpha)]$$
$$= \beta\sin(2\pi f_m t) + \alpha.$$

The resulting phase, $\beta\sin(2\pi f_m t)+\alpha$, exactly, or substantially, represents the vibration of the object. Therefore, the PBS system 100 is capable of sensing the actual phase change due to the vibration, without distortion from harmonic content, and acts as a highly tuned displacement sensor since the phase can be directly converted into distance when the system has been calibrated, the transmit frequency is known, and the movement is less than a wavelength, or the initial distance to object is known.

Note that the diode detectors 532 and 534 (FIG. 5A) produce in-phase and quadrature radar signals that are preferably exactly 90 degrees out of phase with respect to one another and that the gains of the signals form the two detectors are exactly, or almost exactly matched. In a typical implementation using known components, manufacturing tolerances make it difficult for the detectors to be ideally matched and/or spatially separated, and therefore, the system can suffer from non-linearities, which degrade the measurements. Another aspect of the preferred embodiment of the invention is the ability to "fix" this non-linear condition. This can be done mathematically by applying the following transformations to the outputs of the PBS system 100. Given a signal z(t) composed of the in-phase signal, x(t), and quadrature signal, y(t), the following equation can be provided:

$$z(t) = x(t) + i^*y(t). \qquad \text{Eq. 14}$$

Now, let the phase mismatch between signals x(t) and y(t) be $\varnothing^1$ and the amplitude mismatch be $\epsilon$. Then, x(t) can be defined as the reference, and y(t) can be transformed to be precisely 90 degrees out of phase and balanced in amplitude with x(t) using the following transformation. The new signal y'(t) is defined to be $$y'(t) = \tan(\varnothing^1)^* x(t) = 1/(1+\epsilon) \cos(\varnothing^1)^* y(t). \qquad \text{Eq. 15}$$

Practically, this can be performed in the digital domain according to mechanisms well-known in the art once the differences between the two signals have been measured.

The above described derivation can be presented as an algorithm performed in the PBS logic of the SPU 420 of the PBS system 100 (FIG. 4), as shown in FIG. 9. In general, as described above, the PBS system 100 is measuring motion less than a wavelength where the output of the PBS system 100 (i.e., the output of the SPU 420) is the actual vibration frequency of the targeted object and not the Doppler frequency. The PBS logic of the SPU 420 provides a measurement of the actual relative displacement of an object (sensed, or targeted) relative to the radar emitter of the SDU 410 (FIG. 4), including vibrating objects, irrespective of the transmit frequency, substantially void of harmonic distortion, for motion less than one wavelength. The PBS logic enables measurement of small motion at a high resolution, less than a wavelength, on the order of microns. Note that the PBS logic also enables measurements of motion of one wavelength or greater (via the addition of calculating phasor rotations), as described above.

Referring to the flowchart of FIG. 9, step 910 includes measuring the amplitude of a reference signal at two detectors that are offset in phase. Step 920 includes measuring the amplitude of a reflected signal at the two detectors. Step 930 includes mathematically relating the change in amplitude between the reference signal and the reflected signal at the two detectors to a change in phase, wherein the change in phase results from the relative motion of the object. Step 940 includes mathematically relating the change in phase to the relative motion of the object, such that an object displacement measurement is provided with sub-wavelength resolution. The flow chart of FIG. 9 shows the architecture, functionality, and operation of a possible implementation of the operating software (herein PBS logic, as described below) of the SPU 420. In this regard, each block represents a module, segment, or portion of code, which comprises one or more executable instructions for implementing the specified logical function(s). It should also be noted that in some alternative implementations, the functions noted in the blocks may occur out of the order noted in FIG. 9. For example, two blocks shown in succession in FIG. 9 may in fact be executed substantially concurrently or the blocks may sometimes be executed in the reverse order, depending upon the functionality involved.

FIGS. 10A–10B are a block diagrams of an example SPU 420 (FIG. 4) of the PBS system 100 of FIG. 4, in accordance with two embodiments of the invention. The SPU 420 can be implemented as a combination of hardware and software, but is preferably implemented in software. Generally, in terms of hardware architecture, as shown in FIGS. 10A and FIG. 10B, the SPU 420 includes a processor (1008 and/or 1012), memory 1014, and one or more input and/or output (I/O) devices 1016 (or peripherals) that are communicatively coupled via a local interface 1018 to receive the output signals, or conditioned output signals from the detector-diodes 532 and 534 from the SDU 410, and relay a displacement signal to another device. Other components, not shown, may include other processing components such as analog to digital converters, filters, etc. The local interface 1018 can be, for example but not limited to, one or more buses or other wired or wireless connections, as is known in the art. The local interface 1018 may have additional elements, which are omitted for simplicity, such as controllers, buffers (caches), drivers, repeaters, and receivers, to enable communications. Further, the local interface may include address, control, and/or data connections to enable appropriate communications among the aforementioned components. I/O devices 1016 may include devices that communicate both inputs and outputs, for instance but not limited to, a modulator/demodulator (modem; for accessing another device, system, or network), a radio frequency (RF) or other transceiver, a telephonic interface, a bridge, a router, etc.

FIG. 10A describes one embodiment, in which the PBS logic 1010 is implemented as logic structured within the DSP 1012. The DSP 1012 can be custom made or a commercially available DSP, running the PBS logic 1010 alone or in combination with the microprocessor 1008. The microprocessor 1008 is a hardware device for executing software, particularly that stored in memory 1014. The microprocessor 1008 can be any custom made or commercially available processor, a central processing unit (CPU), an auxiliary processor among several processors associated with the PBS logic 1010, a semiconductor based microprocessor (in the form of a microchip or chip set), a macroprocessor, or generally any device for executing software instructions.

FIG. 10B describes another embodiment, wherein the PBS logic 1010 is embodied as programming structure in memory 1014, as will be described below. The memory 1014 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 1014 may incorporate electronic, magnetic, optical, and/or other types of storage media. Note that the memory 1014 can have a distributed architecture, where various components are situated remote from one another, but can be accessed by the microprocessor 1008.

In one implementation, the software in memory 1014 can include PBS logic 1010, which provides executable instructions for implementing the phase-shift-to-displacement signal functionality, as described above. The software in memory 1014 may also include one or more separate programs, each of which comprises an ordered listing of executable instructions for implementing logical functions and operating system functions such as controlling the execution of other computer programs, providing scheduling, input-output control, file and data management, memory management, and communication control and related services.

When the SPU 420 is in operation, the microprocessor 1008, in one implementation, is configured to execute software stored within the memory 1014, to communicate data to and from the memory 1014, and to generally control operations of the PBS system 100 pursuant to the software.

When the PBS logic 1010 is implemented in software, it should be noted that the PBS logic 1010 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The PBS logic 1010 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read- only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the PBS logic 1010 is implemented in hardware, the PBS logic 1010 can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A sensing and measurement method, comprising the steps of:

transmitting a reference signal at an object;

measuring the amplitude of the reference signal at two detectors, wherein the two detectors are offset in phase;

measuring the amplitude of a reflected signal at the two detectors;

mathematically relating the change in amplitude between the reference signal and the reflected signal at the two detectors to a change in phase, wherein the change in phase results from the relative motion of the object; and mathematically relating the change in phase with the relative motion of the object, such that an object displacement measurement is provided with sub-wavelength resolution.

2. A method for sensing and measuring the relative motion of an object, comprising the steps of:

measuring a change in amplitude between a transmitted signal and a reflected signal at a plurality of detectors that are offset in phase;

relating the change in amplitude to a change in phase that results from the relative motion of the object; and relating the change in phase to the motion of the object.

3. The method of claim 2, further comprising the step of mathematically deriving a phasor from the outputs of the detectors.

4. The method of claim 3, further comprising the step of using the relationship of a phasor angle between the detectors to a complete phasor revolution, wherein the phasor angle is mathematically related to the ratio of actual movement distance to a frequency wavelength of the transmitted signal.

5. The method of claim 4, further comprising the step of using the outputs of the detectors to derive amplitude coordinates for the phasor angle.

6. The method of claim 3, further comprising the step of counting the revolutions of the phasor to provide sub-wavelength resolution measurements of the relative displacement of the object for relative displacements greater than one wavelength.

7. The method of claim 2, further comprising the step of providing a displacement measurement from the change in phase for displacements of less than one wavelength and for displacements of greater than one wavelength.

8. The method of claim 2, further comprising the step of directing the transmitted signal downward from a vehicle to a surface located before at least one surface contact point of the vehicle.

9. The method of claim 8, further comprising the step of providing an indication of the topology of the surface relative to the source of the transmitted signal.

10. The method of claim 2, further comprising the step of using the measuring step and the relating steps to provide a measurement of machine movement.

11. The method of claim 2, further comprising the step of using the measuring step and the relating steps to provide a measurement of machine part movement.

12. The method of claim 2, further comprising the step of using the measuring step and the relating steps to provide a measurement of engine blade motion.

13. A method for sensing and measuring the relative motion of an object, comprising the steps of:

measuring a phase shift resulting from the relative motion of the object between a transmitted signal and a reflected signal at a plurality of detectors; and relating the phase shift to the relative motion of the object.

14. The method of claim 13, further comprising the step of configuring the detectors to be offset in phase.

15. The method of claim 13, further comprising the step of measuring a change in amplitude between the transmitted signal and the reflected signal at the plurality of detectors.

16. The method of claim 15, further comprising the steps of relating the change in amplitude to the phase shift, and relating the phase shift to the motion of the object.

17. The method of claim 13, further comprising the step of mathematically deriving a phasor from the outputs of the detectors.

18. The method of claim 17, further comprising the step of using the relationship of a phasor angle between the detectors to a complete phasor revolution, wherein the phasor angle is mathematically related to the ratio of actual movement distance to a frequency wavelength of the transmitted signal.

19. The method of claim 18, further comprising the step of using the outputs of the detectors to derive amplitude coordinates for the phasor angle.

20. The method of claim 17, further comprising the step of counting the revolutions of the phasor to provide sub-wavelength resolution measurements of the relative displacement of the object for relative displacements greater than one wavelength.

21. The method of claim 13, further comprising the step of providing a displacement measurement from the change in phase for displacements of less than one wavelength and for displacements of greater than one wavelength.

22. The method of claim 13, further comprising the step of directing the transmitted signal downward from a vehicle to a surface located before at least one surface contact point of the vehicle.

23. The method of claim 22, further comprising the step of providing an indication of the topology of the surface relative to the source of the transmitted signal.

24. The method of claim 13, further comprising the step of using the measuring and the relating steps to provide a measurement of machine movement.

25. The method of claim 13, further comprising the step of using the measuring and the relating steps to provide a measurement of machine part movement.

26. The method of claim 13, further comprising the step of using the measuring and the relating steps to provide a measurement of engine blade motion.

27. A sensing and measurement system, comprising:

a transceiver device configured to transmit a reference signal toward an object, wherein the transceiver device is further configured with two detectors offset in phase to receive a reflected signal; and a processor configured with logic to measure the amplitude of the reference signal at the two detectors, wherein the processor is further configured with the logic to measure the amplitude of the reflected signal at the two detectors, wherein the processor is further configured with the logic to mathematically relate the change in amplitude between the reference signal and the reflected signal at the two detectors to a change in phase, wherein the change in phase results from the relative motion of the object, wherein the processor is further configured with the logic to mathematically relate the change in phase with the relative motion of the object, such that an object displacement measurement is provided with sub-wavelength resolution.

28. A system for sensing and measuring the relative motion of an object, comprising:

a transceiver device configured to transmit a signal toward an object;

a plurality of signal detectors offset in phase to receive the transmitted signal and a reflected signal; and a processor configured with logic to measure a change in amplitude between the transmitted signal and the reflected signal at the plurality of detectors, wherein the processor is further configured with the logic to relate the change in amplitude to a change in phase that results from the relative motion of the object, wherein the processor is further configured with the logic to relate the change in phase to the motion of the object.

29. The system of claim 28, wherein the processor is further configured with the logic to mathematically derive a phasor from the outputs of the detectors.

30. The system of claim 29, wherein the processor is further configured with the logic to use the relationship of a phasor angle between the detectors to a complete phasor revolution, wherein the phasor angle is mathematically related to the ratio of actual movement distance to a frequency wavelength of the transmitted signal.

31. The system of claim 30, wherein the processor is further configured with the logic to use the outputs of the detectors to derive amplitude coordinates for the phasor angle.

32. The system of claim 29, wherein the processor is further configured with the logic to count the revolutions of the phasor to provide sub-wavelength resolution measurements of the relative displacement of the object for relative displacements greater than one wavelength.

33. The system of claim 28, wherein the processor is further configured with the logic to provide a displacement measurement from the change in phase for displacements of less than one wavelength and for displacements of greater than one wavelength.

34. The system of claim 28, wherein the transceiver is further configured to direct the transmitted signal downward from a vehicle to a surface located before at least one surface contact point of the vehicle.

35. The system of claim 34, wherein the processor is further configured with the logic to provide an indication of the topology of the surface relative to the source of the transmitted signal.

36. The system of claim 28, wherein the processor is further configured with the logic to provide a measurement of machine movement.

37. The system of claim 28, wherein the processor is further configured with the logic to provide a measurement of machine part movement.

38. The system of claim 28, wherein the processor is further configured with the logic to provide a measurement of engine blade motion.

39. A system for sensing and measuring the relative motion of an object, comprising:
   a transceiver device configured to transmit a signal toward an object;
   a plurality of detectors offset in phase to receive the transmitted signal and a reflected signal; and
   a processor configured with logic to measure a phase shift resulting from the relative motion of the object between the transmitted signal and the reflected signal at the plurality of detectors, wherein the processor is further configured with the logic to relate the phase shift to the relative motion of the object.

40. The system of claim 39, wherein the processor is further configured with the logic to measure a change in amplitude between the transmitted signal and the reflected signal at the plurality of detectors.

41. The system of claim 40, wherein the processor is further configured with the logic to relate the change in amplitude to the phase shift, and relate the phase shift to the motion of the object.

42. The system of claim 39, wherein the processor is further configured with the logic to mathematically derive a phasor from the outputs of the detectors.

43. The system of claim 42, wherein the processor is further configured with the logic to use the relationship of a phasor angle between the detectors to a complete phasor revolution, wherein the phasor angle is mathematically related to the ratio of actual movement distance to a frequency wavelength of the transmitted signal.

44. The system of claim 43, wherein the processor is further configured with the logic to use the outputs of the detectors to derive amplitude coordinates for the phasor angle.

45. The system of claim 42, wherein the processor is further configured with the logic to count the revolutions of the phasor to provide sub-wavelength resolution measurements of the relative displacement of the object for relative displacements greater than one wavelength.

46. The system of claim 39, wherein the processor is further configured with the logic to provide a displacement measurement from the change in phase for displacements of less than one wavelength and for displacements of greater than one wavelength.

47. The system of claim 39, wherein the transceiver is further configured to direct the transmitted signal downward from a vehicle to a surface located before at least one surface contact point of the vehicle.

48. The system of claim 47, wherein the processor is further configured with the logic to provide an indication of the topology of the surface relative to the source of the transmitted signal.

49. The system of claim 39, wherein the processor is further configured with the logic to provide a measurement of machine movement.

50. The system of claim 39, wherein the processor is further configured with the logic to provide a measurement of machine part movement.

51. The system of claim 39, wherein the processor is further configured with the logic to provide a measurement of engine blade motion.

52. A processing system on a recordable medium, the processing system comprising:
   logic configured to measure the amplitude of a reference signal at two detectors;
   logic configured to measure the amplitude of a reflected signal at the two detectors;
   logic configured to mathematically relate the change in amplitude between the reference signal and the reflected signal at the two detectors to a change in phase, wherein the change in phase results from the relative motion of the object; and
   logic configured to mathematically relate the change in phase with the relative motion of the object, such that an object displacement measurement is provided with sub-wavelength resolution.

53. A processing system on a recordable medium, the processing system comprising:
   logic configured to measure a phase shift resulting from the relative motion of an object between a transmitted signal and a reflected signal at a plurality of detectors, wherein the plurality of detectors are offset in phase; and
   logic configured to relate the phase shift to the relative motion of the object.

54. The processing system of claim 53, wherein the logic is further configured to measure a change in amplitude between the transmitted signal and the reflected signal at the plurality of detectors.

55. The processing system of claim 54, wherein the logic is further configured to relate the change in amplitude to the phase shift, and relate the phase shift to the motion of the object.

56. The processing system of claim 53, wherein the logic is further configured to mathematically derive a phasor from the outputs of the detectors.

57. The processing system of claim 56, wherein the logic is further configured to use the relationship of a phasor angle between the detectors to a complete phasor revolution, wherein the phasor angle is mathematically related to the ratio of actual movement distance to a frequency wavelength of the transmitted signal.

58. The system of claim 57, wherein the logic is further configured to use the outputs of the detectors to derive amplitude coordinates for the phasor angle.

59. The processing system of claim 56, wherein the logic is further configured to count the revolutions of the phasor to provide sub-wavelength resolution measurements of the relative displacement of the object for relative displacements greater than one wavelength.

60. The processing system of claim 53, wherein the logic is further configured to provide a displacement measurement from the change in phase for displacements of less than one wavelength and for displacements of greater than one wavelength.

61. A method for sensing and measuring the relative motion of an object, comprising the steps of:
multiplying an unmodulated transmitted signal with a reflected signal at a plurality of detectors;
measuring a phase shift resulting from the relative motion of the object between the unmodulated transmitted signal and the reflected signal; and
relating the phase shift to the relative motion of the object.

62. The method of claim 61, further comprising the step of configuring the detectors to be offset in phase.

63. The method of claim 61, further comprising the step of measuring a change in amplitude between the unmodulated transmitted signal and the reflected signal at the plurality of detectors.

64. The method of claim 63, further comprising the steps of:
relating the change in amplitude to the phase shift; and
relating the phase shift to the motion of the object.

65. The method of claim 61, further comprising the step of mathematically deriving a phasor from the outputs of the detectors.

66. The method of claim 65, further comprising the step of using the relationship of a phasor angle between the detectors to a complete phasor revolution, wherein the phasor angle is mathematically related to the ratio of actual movement distance to a frequency wavelength of the unmodulated transmitted signal.

67. The method of claim 66, further comprising the step of using the outputs of the detectors to derive amplitude coordinates for the phasor angle.

68. The method of claim 65, further comprising the step of counting the revolutions of the phasor to provide sub-wavelength resolution measurements of the relative displacement of the object for relative displacements greater than one wavelength.

69. The method of claim 61, further comprising the step of providing a displacement measurement from the change in phase for displacements of less than one wavelength and for displacements of greater than one wavelength.

70. The method of claim 61, further comprising the step of directing the transmitted signal downward from a vehicle to a surface located before at least one surface contact point of the vehicle.

71. The method of claim 70, further comprising the step of providing an indication of the topology of the surface relative to the source of the unmodulated transmitted signal.

72. The method of claim 61, further comprising the step of using the measuring and the relating steps to provide a measurement of machine movement.

73. The method of claim 61, further comprising the step of using the measuring and the relating steps to provide a measurement of machine part movement.

74. The method of claim 61, further comprising the step of using the measuring and the relating steps to provide a measurement of engine blade motion.

75. The method of claim 61, wherein the unmodulated transmitted signal is transmitted at defined intervals.

76. A system for sensing and measuring the relative motion of an object, comprising:
a transceiver device configured to transmit an unmodulated signal toward an object;
a plurality of detectors, offset in phase, that multiply the unmodulated transmitted signal and a reflected signal; and
a processor configured with logic to measure a phase shift resulting from the relative motion of the object between the unmodulated transmitted signal and the reflected signal, wherein the processor is further configured with the logic to relate the phase shift to the relative motion of the object.

77. The system of claim 76, wherein the processor is further configured with the logic to measure a change in amplitude between the unmodulated transmitted signal and the reflected signal at the plurality of detectors.

78. The system of claim 77, wherein the processor is further configured with the logic to relate the change in amplitude to the phase shift, and relate the phase shift to the motion of the object.

79. The system of claim 76, wherein the processor is further configured with the logic to mathematically derive a phasor from the outputs of the detectors.

80. The system of claim 79, wherein the processor is further configured with the logic to use the relationship of a phasor angle between the detectors to a complete phasor revolution, wherein the phasor angle is mathematically related to the ratio of actual movement distance to a frequency wavelength of the unmodulated transmitted signal.

81. The system of claim 80, wherein the processor is further configured with the logic to use the outputs of the detectors to derive amplitude coordinates for the phasor angle.

82. The system of claim 79, wherein the processor is further configured with the logic to count the revolutions of the phasor to provide sub-wavelength resolution measurements of the relative displacement of the object for relative displacements greater than one wavelength.

83. The system of claim 76, wherein the processor is further configured with the logic to provide a displacement measurement from the change in phase for displacements of less than one wavelength and for displacements of greater than one wavelength.

84. The system of claim 76, wherein the transceiver is further configured to direct the unmodulated transmitted signal downward from a vehicle to a surface located before at least one surface contact point of the vehicle.

85. The system of claim 84, wherein the processor is further configured with the logic to provide an indication of the topology of the surface relative to the source of the unmodulated transmitted signal.

86. The system of claim 76, wherein the processor is further configured with the logic to provide a measurement of machine movement.

87. The system of claim 76, wherein the processor is further configured with the logic to provide a measurement of machine part movement.

88. The system of claim 76, wherein the processor is further configured with the logic to provide a measurement of engine blade motion.

89. The system of claim 76, wherein the logic resides on a computer readable medium.

90. The system of claim 76, wherein the unmodulated transmitted signal is transmitted at defined intervals.

* * * * *